(12) United States Patent  
Ripa

(10) Patent No.: US 10,473,179 B2
(45) Date of Patent: Nov. 12, 2019

(54) MOVEMENT STAGE FOR A HYDRAULIC SHOCK ABSORBER AND SHOCK ABSORBER WITH THE MOVEMENT STAGE

(71) Applicant: Thomas Ripa, Herrsching (DE)

(72) Inventor: Thomas Ripa, Herrsching (DE)

(*) Notice: Subject to any disclaimer, the term of this patent is extended or adjusted under 35 U.S.C. 154(b) by 77 days.

(21) Appl. No.: 15/159,522

(22) Filed: May 19, 2016

(65) Prior Publication Data

US 2016/0265614 A1    Sep. 15, 2016

Related U.S. Application Data

(63) Continuation of application No. PCT/EP2014/074854, filed on Nov. 18, 2014.

(30) Foreign Application Priority Data

Nov. 19, 2013 (DE) .................. 10 2013 112 739

(51) Int. Cl.
  *F16F 9/348* (2006.01)
  *F16F 9/512* (2006.01)
  (Continued)

(52) U.S. Cl.
  CPC ............ *F16F 9/3488* (2013.01); *F16F 9/369* (2013.01); *F16F 9/512* (2013.01); *F16F 9/062* (2013.01);
  (Continued)

(58) Field of Classification Search
  CPC .......... F16F 9/3488; F16F 9/369; F16F 9/512; F16F 9/062; F16F 2228/066; F16F 2238/04
  See application file for complete search history.

(56) References Cited

U.S. PATENT DOCUMENTS

| 4,749,069 A | 6/1988 | Knecht et al. |
| 4,958,706 A * | 9/1990 | Richardson ............ F16F 9/096 188/277 |

(Continued)

FOREIGN PATENT DOCUMENTS

| DE | 3830343 A1 | 3/1990 |
| DE | 3910119 A1 | 10/1990 |

(Continued)

OTHER PUBLICATIONS

International Search Report dated Apr. 7, 2015 of international application PCT/EP2014/074854 on which this application is based.

(Continued)

*Primary Examiner* — Melody M Burch
(74) *Attorney, Agent, or Firm* — Falk Ewers; Ewers IP Law PLLC

(57) ABSTRACT

A movement stage for a hydraulic shock absorber has a damping volume and a stage throttle with a valve disk, an analogue piston, and an elastic biasing means supported on the analogue piston and on the valve disk. The valve disk has a pressure surface defining a portion of the surface of a disk valve arranged upstream of an entry edge of a disk valve seat. The analogue piston has a pressure surface facing away from the biasing means. The valve disk pressure surface and the analogue piston pressure surface are impinged by damping fluid flowing out of the damping volume as the shock absorber moves in a movement direction. The analogue piston pressure surface is larger than the valve disk pressure surface when projected in the closing direction of the disk valve so that the analogue piston is displaced and the bias of the valve disk increases.

30 Claims, 9 Drawing Sheets

(51) Int. Cl.
*F16F 9/36* (2006.01)
*F16F 9/06* (2006.01)

(52) U.S. Cl.
CPC ..... *F16F 2228/066* (2013.01); *F16F 2238/04* (2013.01)

(56) References Cited

U.S. PATENT DOCUMENTS

| | | | |
|---|---|---|---|
| 5,046,755 | A | 9/1991 | Runkel et al. |
| 5,222,759 | A | 6/1993 | Wanner et al. |
| 5,375,683 | A | 12/1994 | Huang et al. |
| 5,386,893 | A | 2/1995 | Feigel |
| 5,392,885 | A | 2/1995 | Patzenhauer et al. |
| 5,449,055 | A | 9/1995 | Geiling et al. |
| 7,147,207 | B2 | 12/2006 | Jordan et al. |
| 7,234,576 | B2 | 6/2007 | Sirven |
| 8,453,806 | B2 | 6/2013 | Battlogg et al. |
| 8,935,984 | B2 | 1/2015 | Sasaki et al. |
| 2004/0134730 | A1* | 7/2004 | Forster ................ F16F 9/062 188/314 |
| 2007/0000743 | A1* | 1/2007 | Naitou ................ B60G 15/12 188/322.2 |
| 2013/0161138 | A1 | 6/2013 | Barefoot |
| 2016/0215849 | A1 | 7/2016 | Kurita |

FOREIGN PATENT DOCUMENTS

| | | |
|---|---|---|
| DE | 4132262 A1 | 4/1993 |
| DE | 60310903 T2 | 10/2007 |
| DE | 102006054632 A1 | 5/2008 |
| DE | 102011002339 A1 | 10/2012 |
| EP | 2278185 A1 | 1/2011 |
| EP | 2357098 A2 | 8/2011 |
| EP | 2 518 365 A2 | 10/2012 |
| GB | 2223822 A | 4/1990 |
| TW | M437402 U | 9/2012 |
| TW | 201313528 A | 4/2013 |
| WO | 9840231 A2 | 9/1998 |

OTHER PUBLICATIONS

Office Action issued in German Patent Application No. DE 10 2013 112 739.8 (from which this application claims priority), dated Aug. 8, 2014 and English language machine translation thereof.
Office Action issued in German Patent Application No. DE 10 2013 112 739.8 (from which this application claims priority), dated Jun. 19, 2017 and English language machine translation thereof.
Braess, H.-H.; Seiffert, U., Vieweg Handbuch Kraftfahrzeugtechnik, 2013, p. 755, and English language machine translation thereof.
Grundwissen, Bilstein, https://www2.bilstein.com/de/technologie-und-wissen/grundwissen/, downloaded on Jun. 19, 2017, and English language machine translation thereof.
Office Action and Search Report dated Apr. 23, 2018 issued in Taiwanese counterpart application No. 103139895 and English-language machine translation thereof.
Office Action and Search Report dated Apr. 23, 2018 issued in Taiwanese counterpart application No. 103139898 and English-language machine translation thereof.
U.S. Appl. No. 15/159,540, filed May 19, 2016, Thomas Ripa.

* cited by examiner

MOVEMENT STAGE FOR A HYDRAULIC SHOCK ABSORBER AND SHOCK ABSORBER WITH THE MOVEMENT STAGE

CROSS REFERENCE TO RELATED APPLICATIONS

This application is a continuation application of international patent application PCT/EP2014/074854, filed Nov. 18, 2014, designating the United States and claiming priority from German application 10 2013 112 739.8, filed Nov. 19, 2013, and the entire content of both applications is incorporated herein by reference.

FIELD OF THE INVENTION

The invention relates to a movement stage for a hydraulic shock absorber and the shock absorber with the movement stage.

BACKGROUND OF THE INVENTION

A damping strut in combination with a spring strut utilized as a wheel suspension for a bicycle is known. The damping strut has a hydraulic shock absorber that is a monotube shock absorber filled with a damping fluid. A damping piston is supported in the monotube shock absorber such that it can be displaced longitudinally for displacing the damping fluid. The damping piston has a plurality of damping openings. During retraction and extension of the damping strut, the damping piston is displaced in the monotube shock absorber, and the damping fluid is displaced by the damping piston such that the damping fluid flows through the damping openings. The flow of the damping fluid in the monotube shock absorber, in particular through the damping openings, is lossy, and results in a damping force that counteracts the movement of the damping strut.

Requirements in particular with respect to the strength and the dynamic of the damping force are applied to the damping strut during occurrence of diverse riding situations with the bicycle, wherein a ride with the bicycle with high safety and with high comfort is supposed to be enabled by the requirements. Thus, it is desirable, when, for example, the bicycle is driven over a high curbstone edge or a lower stone, independent of the stroke position of the damping strut being thereby present, the damping force of the shock absorber is in both cases first possibly low and increases smoothly with a slight increase in the following stroke course so that the highest damping force is reached during reaching a maximum of the obstacle, thus still before the maximum amplitude of the stroke excitation by the obstacle. At the beginning, the damping strut can be retracted fast over the obstacle by the described damping force course, whereby the wheel can dodge the obstacle well without transmitting an overly impact from the curbstone edge or the stone to the frame of the bicycle and whereby the wheel is maximally decelerated during reaching the maximum of the obstacle so that further (and therefore harmful) retraction of the wheel caused by the inertia of the unsprung masses is prevented, whereby a contact loss to the road is prevented. The safety as well as the comfort of the rider during riding is therefore increased and the fluctuation of the wheel load of the sprung wheel is reduced, so that the tyre-road contact is increased.

The stroke excitation is defined as the momentum that causes the movement of the damping strut during the influence duration of the momentum, that is, during the excitation duration. The stroke excitation maximum is the maximum stroke height of a theoretical, barely damped damping strut, wherein the maximum stroke height is caused by this momentum influence. The maximum of the obstacle is the maximum height difference of the obstacle in relation to the height level of the road surrounding the obstacle, wherein the maximum height difference has to be overridden by the damping strut during rolling over the obstacle.

The rider of the bicycle generally performs a rhythmic weight shift during pedalling, whereby the bicycle is brought in a rocking movement. When the rider of the bicycle initiates an abrupt braking manoeuver, the nodding momentum thereby acting on the vehicle's center of mass leads to a strong retraction of the damping strut of the front wheel and simultaneously to a strong extension of the damping strut of the rear wheel. Pedalling induced rocking movements and braking induced retraction and extension movements of the damping strut are tendentiously perceived as being disturbing and can even, when having a too large extends, become a safety risk for the rider. It is therefore further desirable that the damping force possibly increases fast and very strong during these undesired shock absorber movements, whereby these stroke excitations are attenuated by the damping strut still before the damping strut can retract far, so that a ride with high comfort and with high safety is enabled.

SUMMARY OF THE INVENTION

It is an object of the invention to provide a movement stage for a hydraulic shock absorber and the shock absorber with the movement stage, wherein a safe and comfortable ride is enabled with the shock absorber in a vehicle.

The object is solved by providing a movement stage for a hydraulic shock absorber including: a damping volume filled with an incompressible damping fluid; a stage throttle having a disk valve with a valve disk, an analogue piston and an elastic biasing means configured for biasing the valve disk in a closing direction of the disk valve; the stage throttle being arranged so that the damping fluid flows through the stage throttle in a direction opposite to the closing direction of the disk valve as the shock absorber moves in at least one movement direction; the disk valve being configured to generate a shock absorber resistance force; the elastic biasing means being supported on the analogue piston and on the valve disk to elastically couple the analogue piston via the elastic biasing means with the disk valve; the valve disk having a valve disk pressure surface; the valve disk pressure surface being a portion of a surface of the disk valve that is arranged upstream of an entry edge of a disk valve seat; the analogue piston having an analogue piston pressure surface; the analogue piston pressure surface being arranged to face away from the biasing means; the valve disk pressure surface and the analogue piston pressure surface being impinged by the damping fluid flowing out of the damping volume during the movement of the shock absorber in the at least one movement direction; and, the analogue piston pressure surface being larger than the valve disk pressure surface when projected in the closing direction of the disk valve so that a bias of the valve disk is increased when the analogue piston is displaced towards the biasing means as the shock absorber moves in the at least one movement direction.

According to an aspect of the invention, the movement stage for a hydraulic shock absorber has a damping volume that is filled with an incompressible damping fluid. The movement stage according to the aspect of the invention includes a stage throttle that has a disk valve with a valve disk. The damping fluid flows through the stage throttle opposite to the closing direction of the disk valve as the shock absorber moves in one of the movement directions, whereby a shock absorber resistance force is generated by the valve disk. According to an aspect of the invention, the stage throttle includes an analogue piston and, for biasing the valve disk in the closing direction of the disk valve, an elastic biasing means that is supported on the analogue piston and on the valve disk, so that the analogue piston is elastically coupled with the disk valve via the biasing means. According to an aspect of the invention, the valve disk has a valve disk pressure surface that is a portion of the surface of the disk valve, which is arranged upstream of the entry edge of the disk valve seat. The analogue piston has an analogue piston pressure surface arranged to face away from the biasing means, wherein the valve disk pressure surface and the analogue piston pressure surface are impinged by damping fluid flowing out of the damping volume during the movement of the shock absorber in at least one movement direction and, projected in the closing direction of the disk valve, the analogue piston pressure surface is larger than the valve disk pressure surface, so that the analogue piston is displaced in the direction of the biasing means as the shock absorber moves in at least one movement direction and the bias force of the valve disk therefore increases.

The invention is based on the following observations: Despite completely differently high stroke excitation maxima, the excitation duration of the stroke excitation caused by different obstacles, for example by a curbstone edge or by a lower stone and the excitation duration of the desired movements of the damping strut triggered thereby, are approximately equally long. This is true in particular until the reaching of the respective obstacle maximum, or of the respective stroke excitation maximum. The excitation duration of the stroke excitation changes over the range of the typical ride velocities of the bicycle only to a small extent and is considerably shorter than the often multiple times longer excitation duration that is caused by rocking excitations as well as by braking induced stroke excitations that trigger undesired movements of the shock absorber. In contrast, if the amplitudes of the stroke excitations of the desired and undesired shock absorber movements are compared with each other, no distinguishing quantitative feature between both groups can be recognized. The same is true for the retraction or extension velocities of the damping strut. These relationships are revealed both during the retraction and during the extension of the shock absorber.

According to an aspect of the invention, the analogue piston pressure surface projected in the closing direction of the disk valve is up to four times larger than the valve disk pressure surface. The analogue piston preferably includes an analogue piston counter surface that is facing away from the analogue piston pressure surface and that is impinged by the damping fluid that has already passed the disk valve seat during the movement of the shock absorber in the one movement direction. Further, the analogue piston pressure surface and the analogue piston counter surface projected in the closing direction of the disk valve are preferably equally large.

The elastic biasing means is preferably arranged between the analogue piston and the valve disk, so that the elastic biasing means is spatially isolated from the damping fluid that has not yet passed the disk valve seat during the movement of the shock absorber in the movement direction. According to another aspect of the invention, the analogue piston lies on the disk valve such that the analogue piston can be displaced and the analogue piston is sealed by damping fluid, that is, sealed by a damping fluid seal.

The disk valve includes a valve shaft that has a shape of a hollow cylinder, wherein the valve disk is arranged outside the valve shaft, and the analogue piston is arranged in the valve shaft such that the analogue piston can be displaced. The valve shaft has on its inner side a protrusion, on which the biasing means is supported. The analogue piston can preferably be brought in a first extreme position, in which the bias force that is brought from the analogue piston via the biasing means on the valve disk is minimal, or zero. According to a further aspect of the invention, the analogue piston can be brought in a second extreme position, in which the bias force that is brought from the analogue piston via the biasing means on the valve disk has a maximum value. The analogue piston is displaced during the movement from the first extreme position to the second extreme position, in particular in the closing direction of the disk valve. It is hereby preferred that the analogue piston lies in its second extreme position on a stop of the movement stage. The stop is attached in such a position that the valve disk can still carry out its full valve stroke under elastic bias by the biasing means. It is therefore required that a small remaining stroke of the biasing means is still available in this position, wherein the remaining stroke is at least as high as the complete valve stroke of the valve disk.

According to an aspect of the invention, the movement stage has a non-return valve with a closing direction opposite to the closing direction of the disk valve and a seat ring being concentrically arranged around the valve shaft, wherein the disk valve seat is formed on a front side of the seat ring and the non-return valve seat is formed on the other side of the seat ring, so that the non-return valve is closed during the open disk valve and the non-return valve is open during the closed disk valve, whereby the non-return valve acts as a counter stage throttle to the stage throttle.

The biasing means is preferably a coil spring. According to another aspect of the invention, the biasing means is a gas spring. The protrusion is formed in a shape of a ring and the analogue piston has a piston shaft that extends through the opening of the protrusion and lies gas sealed on the protrusion, wherein a chamber is confined between the analogue piston and the protrusion, wherein the chamber is filled with gas. According to a further aspect of the invention, the analogue piston has two piston heads that are held in a distance to each other by the piston shaft, wherein the protrusion is arranged between the piston heads, so that a first chamber and a second chamber are confined by the piston heads and the protrusion, wherein the chambers are filled with gas. The piston shaft preferably has a connection recess, wherein, when the analogue piston is in such a position that the protrusion is arranged immediately neighbored to the connection recess, so that both chambers are connected with each other in a gas conductive manner, the gas pressure equalizes in both chambers via the connection recess.

According to a further aspect of the invention, an alternative movement stage is provided that differs from the preceding movement stage in that the elastic biasing means is supported on the analogue piston and on a support seat of the movement stage. The analogue piston pressure surface of the analogue piston is arranged to face away from the biasing means, and the valve disk pressure surface of the valve disk is a portion of the surface of the valve disk that is arranged upstream of the entry edge of the disk valve seat. The valve disk has a valve disk piston surface that is arranged to face away from the valve disk pressure surface, wherein the valve disk pressure surface and the valve disk piston surface and the analogue piston pressure surface are impinged by damping fluid flowing out of the damping volume as the shock absorber moves in the at least one movement direction, so that the biasing means is coupled with the disk valve via the analogue piston and the damping fluid impinged on the valve disk piston surface, and, projected in the closing direction of the disk valve, the valve disk piston surface is larger than the valve disk pressure surface, so that the analogue piston is displaced in a direction toward the biasing means and the bias force of the valve disk therefore increases as the shock absorber moves in the at least one movement direction.

According to an aspect of the invention, projected in the closing direction of the disk valve, the valve disk piston surface is up to four times larger than the valve disk pressure surface. According to another aspect of the invention, projected in the closing direction of the disk valve, the analogue piston pressure surface and the valve disk piston surface are preferably equally large. It is furthermore preferred that, projected in the closing direction of the disk valve, the analogue piston pressure surface and the analogue piston counter surface are equally large.

According to an aspect of the invention, the elastic biasing means is arranged between the analogue piston and the support seat, so that the elastic biasing means is spatially isolated from the damping fluid that has not yet passed the disk valve seat as the shock absorber moves in the at least one movement direction.

The analogue piston is arranged such that it can be displaced in a hollow cylinder borne in the casing of the shock absorber, wherein the analogue piston is sealed by a damping fluid seal. The analogue piston can be brought in a first extreme position in the hollow cylinder, wherein the bias force that is brought from the analogue piston via the damping fluid to the valve disk piston surface on the valve disk is zero at a first extreme position. It is further preferred that the analogue piston is moved to a second extreme position, at which the bias force that is brought from the biasing means via the analogue piston and the damping fluid over the valve disk piston surface on the valve disk has a maximum value. The damping fluid seal of the analogue piston generates a friction force as the analogue piston moves from the first extreme position to the second extreme position, wherein the friction force increases the bias force of the valve disk in closing direction of the disk valve via the analogue piston and the damping fluid over the valve disk piston surface. It is hereby preferred that the disk valve has a piston stump, wherein the valve disk is arranged on an outside of the piston stump and the valve disk piston surface is arranged on a front side of the piston stump. The hollow cylinder is confined by a side of the analogue piston pressure surface of the analogue piston by the piston stump such that it can be displaced in the hollow cylinder and the hollow cylinder is confined by a side of the analogue piston counter surface on the inner side of the support seat, on which the basing means is supported.

According to an aspect of the invention, the movement stage includes a non-return valve with a closing direction opposite to the closing direction of the disk valve and a seat ring arranged concentrically around the piston stump, wherein the disk valve seat is arranged on a front side of the seat ring and the non-return valve seat is arranged on another front side of the seat ring, so that the non-return valve is closed during the open disk valve and the non-return valve is open during the closed disk valve, whereby the non-return valve acts as a counter stage throttle to the stage throttle.

According to an aspect of the invention, the biasing means is a coil spring. According to another aspect of the invention, the biasing means is a gas spring, wherein the support seat is preferably formed in a shape of a ring and the analogue piston has a piston shaft that extends through the opening of the protrusion and is arranged gas sealed on the protrusion, wherein a chamber is confined between the analogue piston and the support seat, wherein the chamber is filled with gas. It is preferred that the analogue piston has two piston heads that are held in a distance to each other by the piston shaft, and wherein the support seat is arranged between the piston heads, so that a first chamber and a second chamber are confined by the piston heads and the support seat, wherein the chambers are filled with gas. It is furthermore preferred that the piston shaft has a connection recess, wherein, when the analogue piston is in such a position that the support seat is arranged immediately neighbored to the connection recess, both chambers are connected with each other in a gas conductive manner, and the gas pressure equalizes in the both chambers via the connection recess.

The position is the first extreme position for both inventive and preferred movement stages. Further, the stage throttle preferably has a damping fluid channel from the damping volume to the analogue piston pressure surface and a counter channel from the analogue piston counter surface to the damping volume, wherein one of the channels or even both have a cross-section reduction, with which the displacement velocities of the analogue piston in relation to the movement velocities of the shock absorber are adjusted. According to an aspect of the invention, parallel to the cross-section reduction, a back flow bypass with a back flow valve is provided that is connected such that, when the bias force of the valve disk increases via the biasing means by the analogue piston, the back flow valve is in its closed condition and, when the bias force of the valve disk decreases via the biasing means by the analogue piston, the back flow valve is in its open condition.

According to yet another aspect of the invention, the stage throttle has an additional elastic biasing means, with which the valve disk is always biased in the closing direction of the disk valve. The disk valve preferably has an access channel, with which at least one of the chambers can be accessed from the outside. It is hereby preferred that the access channel includes a pipe piece that is arranged perpendicular to the closing direction of the disk valve and is arranged with a first longitudinal end in the disk valve such that it can be pivoted and is arranged with its second longitudinal end in the casing of the shock absorber such that it can pivoted.

According to an aspect of the invention, there is still so much remaining stroke of the elastic biasing means present in the second extreme position of the analogue piston that the valve disk can be brought in its full open condition, whereby the valve disk is always elastically and flexibly biased.

According to another aspect of the invention, the stroke of the analogue piston from its first extreme position to its second extreme position is larger than a complete valve stroke of the valve disk. This stroke of the analogue piston is particularly preferred at least four times larger than the complete valve stroke of the valve disk.

According to yet another aspect of the invention, the elastic biasing means has in at least one range of the valve stroke (x) of the valve disk a force-distance characteristic curve, wherein a first derivative of the force-distance characteristic curve is substantially zero ($F'=dF/dx \approx 0$). It is thereby in particular preferred that the range of the valve stroke (x) corresponds to the complete valve stroke of the valve disk.

The shock absorber according to an aspect of the invention has at least one of the movement stages according to the various aspects of the invention. The shock absorber may include two of the movement stages, wherein one of the movement stages is a compression stage and the other movement stage is a rebound stage.

The bias of the valve disk is obtained with the biasing means. Since the analogue piston is displaced in a direction relative to the biasing means as the shock absorber is moved, the bias of the valve disk can be dosed by the analogue piston. According to an aspect of the invention, the bias of the valve disk is dosed by the analogue piston such that during the retraction of the shock absorber the bias of the valve disk increases at least in part.

The movement stage according to an aspect of the invention is provided with the biasing means such that the valve stroke of the valve disk is generally much smaller than the stroke of the biasing means, whereby the force-distance-characteristic curve of the bias of the valve disk by the biasing means has substantially a constant value in the range of the valve stroke (x), wherein a first derivative of the force-distance-characteristic curve is substantially zero ($F'=dF/dx\approx 0$). A valve stroke of the valve disk is the movement distance of the valve disk with respect to the valve disk seat, so that a valve opening results between the valve disk and the valve disk seat. The maximum open condition of the valve disk is the valve position, at which the valve stroke and therefore the valve opening are at a maximum.

The valve disk is therefore always elastically biased by the biasing means with the constant force-distance-characteristic curve, wherein the level of the bias is given by the analogue piston during the movement of the shock absorber. The intensity of the bias force from the biasing means to the disk valve is controlled by the analogue piston, wherein the characteristic of the force-distance-characteristic curve of the biasing means is unchanged at each point in time, whereby the characteristic of the force-distance-characteristic curve of the bias of the valve disk remains also unchanged. The biasing means can thereby include a linear or a progressive or a degressive force-distance-characteristic curve over its complete stroke. The biasing means acts on the valve disk only gradually and time delayed by the analogue piston, in particular by using a cross-section reduction either in the counter channel or in the damping fluid channel of the analogue piston. The displacement of the analogue piston in a direction toward the biasing means is caused since, projected in the closing direction of the disk valve, the analogue piston pressure surface is larger than the valve disk pressure surface for the first alternative movement stage and, projected in the closing direction of the disk valve, the valve disk piston surface is larger than the valve disk pressure surface for the second alternative movement stage. The size ratio of the involved surfaces results in a respective movement velocity of the analogue piston of the first movement stage according to an aspect of the invention. For the second alternative movement stage, the movement velocity is additionally influenced by the size ratio of the analogue piston pressure surface projected in the closing direction of the disk valve in relation to the valve piston pressure surface projected in the closing direction of the disk valve.

At different movement velocities of the shock absorber, the valve disk is arranged at different valve strokes due to the respective different displacement effects of the damping fluid. Since the force-distance-characteristic curve of the biasing means in the range of the valve stroke (x) is substantially constant over the valve stroke and the first derivative of the force-distance-characteristic curve in the range of the valve stroke (x) is therefore substantially zero ($F'=dF/dx\approx 0$), the bias of the valve disk is thereby almost independent from its current valve stroke at each point in time of the movement, whereby, as a result, the damping force of the shock absorber is also independent from the retraction velocity of the shock absorber at each point in time seen individually.

The pressure of the damping fluid that is coming either from the ascending pipe or from the damping volume that did not yet pass the entry edge of the disk valve seat of this valve disk, is therefore only dependent from the position of the analogue piston. The bias of the biasing means resulting therefrom is independent from the current retraction velocity of the shock absorber. Since this pressure, reduced by an almost constant value when the cross-section reduction is present, is present also on the analogue piston pressure surface of the analogue piston of this valve disk, the force that increasingly compresses the elastic biasing means of this valve disk, and therefore also the movement velocity of the analogue piston is also independent from the current retraction velocity of the shock absorber. The time duration that is required to raise the bias of the biasing means via the analogue piston from the minimum to the maximum value and therefore to bias the valve disk, is therefore also independent from the movement velocity of the shock absorber and therefore even at different stroke velocity courses of the shock absorber always approximately equally long, whereby in turn the retraction resistance force of the shock absorber is particularly advantageous purely dependent on the retraction duration of the shock absorber always in the same manner.

A wheel of a bicycle is for example suspended on the frame of the bicycle with the shock absorber. For example, the bicycle drives towards a curbstone edge. At a point in time, at which the wheel impinges on the curbstone edge, a hard impact, thus a stroke excitation with a high amplitude within a particularly short duration, is transmitted from the curbstone edge to the wheel and therefore to the shock absorber. The shock absorber starts now with the retraction, wherein starting with the retraction, the analogue piston is displaced in a direction toward the biasing means within a predetermined period of time. The bias of the valve disk by the biasing means at the beginning of the retraction of the shock absorber corresponds to a minimum value in a first extreme position of the analogue piston, independent from the strength of the impact and in particular independent from the stroke position of the shock absorber currently being present at the start of the retraction, whereby, caused by the great strength of the impact, the retraction velocity of the shock absorber is high. For example, an increase of the bias of the biasing means by the analogue piston and therefore of the bias of the valve disk of the shock absorber occurs only very gradually over the retraction stroke of the shock absorber, since the shock absorber is configured to perform a long retraction stroke within the (for each stroke excitation always equally long) period of time that is required by the analogue piston to move from the first to the second extreme position and therefore to maximize the bias of the valve disk. The period of time can ideally be set such that the highest damping force is only reached when the obstacle maximum is reached by the shock absorber. In contrast, if the period of time is chosen such that it has not elapsed when reaching the maximum retraction stroke on the obstacle maximum, the maximum damping forces are not even obtained with such obstacles, whereby a maximum comfort setting of the shock absorber is obtained with very hard and fast impacts.

The possibly complete absorption of the described obstacle is only possible since the valve disk has the opening characteristic curve according to an aspect of the invention, whereby it has a very high opening degree without which the bias of the valve disk thereby increases during the particularly high current retraction velocity of the shock absorber, wherein the particularly high current retraction velocity occurs for a short term during overriding the curbstone edge. The damping force of the disk valve at each point in time is therefore independent from the current, in this case very high retraction velocity, whereby a hardening of the shock absorber is first completely prevented and the damping strut resistance force is purely determined by the already elapsed portion of the first period of time and the bias value K thereby transmitted by a bias regulator. The first period of time is thereby simultaneously approximately always equally long despite the high movement velocity of the shock absorber.

The overridden height difference during riding the wheel up the curbstone edge is therefore compensated by the damping strut, whereby the unevenness caused by the curbstone edge is well overridden and barely perceived by a bicycle rider. During reaching the obstacle maximum, the wheel is then already maximally decelerated, so that a further, harmful retraction of the damping strut and therefore the wheel, and therefore a contact loss to the road are prevented.

Since the excitation duration of the shock absorber only varies as described in a very limited manner for different obstacle types, in particular until reaching its obstacle maxima, respectively stroke excitation maxima, the shock absorber generates, caused by the accordingly preset, always equally long time duration that the analogue piston needs to be displaced from the first to the second extreme position and therefore to raise the bias of the biasing means to its maximum value starting from the first impingement of the wheel on the obstacle, the highest damping force reliably only in the range of these obstacle maxima—completely independent on how high its retraction velocity is thereby on the respective obstacle type and which stroke amplitudes it thereby reaches.

In contrast, the shock absorber with the movement stage behaves differently, when an undesired movement with a long enduring stroke excitation occurs, as it is generated in a typical manner, for example, during pedalling or during a braking process initiated by the rider. A fast increase of the bias of the biasing means over the stroke of the shock absorber immediately occurs, since it is only enabled for the long retracting shock absorber in the (always equally long) time duration that the analogue piston needs to move from the first to the second extreme position and therefore to elastically maximal bias the valve disk to perform a very short retraction stroke relative to the maximum amplitude of the stroke excitation. Higher damping forces are therefore built up already at the beginning of the stroke movement within a fraction of the maximum stroke amplitude, and even considerably before the stroke excitation maximum, so that, for example, a brake diving of the front wheel or a rhythmic weight shift of the bicycle rider during pedalling are damped strongly and fast by the shock absorber by increasing the damping force.

This is only possible, since the disk valve can generate sufficient and most notably equally high damping forces during the thereby prevailing, rather low, but definitely strongly varying current retraction velocities of the shock absorber, since the opening characteristic curve of the valve disk according to an aspect of the invention is independent from the current retraction velocity of the shock absorber due to its bias being independent from the opening degree of the valve disk. The damping force is therefore purely determined by the already elapsed part of the time duration and the thereby obtained bias of the biasing means by the analogue piston and the period of time is simultaneously approximately always equally long, despite the different movement velocities of the shock absorber.

The described behavior of the shock absorber according to an aspect of the invention is particularly advantageous, when the front wheel of the bicycle impinges on a large obstacle like the curbstone edge during the beginning of a long enduring stroke excitation, for example, during a strong braking process, thus during a very strong increase of the damping force in relation to the retraction stroke. The opening degree of the always elastically and therefore flexibly biased valve disk immediately increases without further biasing the biasing means, whereby simultaneously and nearly free of delay, the retraction stroke performed by the shock absorber becomes longer, while the analogue piston is displaced in the direction of its second extreme position within the (for each stroke excitation always equally long) period of time, whereby an increase of the damping force immediately flattens over the retraction stroke of the shock absorber. The shock absorber therefore releases more retraction stroke for the occurring obstacle nearly free of delay, whereby it can be absorbed substantially better. If the obstacle is overridden during the further occurring braking process, without that the maximum damping force is thereby reached, the increase gradient of the damping force course is immediately afterwards set up over the further retraction stroke of the shock absorber, which prevailed before the impingement of the wheel on the curbstone edge, whereby the brake diving that would now result is prevented.

As soon as the retraction phase of the shock absorber has ended, the analogue piston of the described compression stage begins to displace back in a direction toward the first extreme position. This is achieved, on the one hand, by the now relaxing biasing means that can now displace with its reset force the analogue piston that became pressure-free on its analogue piston pressure surface and, on the other hand, as soon as the extension of the shock absorber has begun, additionally by the pressure of the damping fluid that has not yet passed the entry edge of the disk valve seat of the now active rebound stage, wherein the pressure acts on the analogue piston counter surface of the compression stage in the same direction as the biasing means. Besides, the back flow valve opens and so bridges the cross-section reduction, whereby the cross-section reduction becomes ineffective in its delaying function, whereby the reset duration that the analogue piston requires to move from the second to the first extreme position is only a fraction of the period of time that is necessary in a reverse direction.

As soon as a new retraction of the shock absorber occurs, the analogue piston of the compression stage is reset in its first extreme position by this fast reset, so that the bias of the disk valve and therefore the damping force is again minimal, in particular zero. The damping force course is therefore reset to its minimum value at a new start of the retraction mostly independent from the stroke position of the shock absorber being present at the start of the retraction. This is of vital importance, since the shock absorber in operation, when the wheel damped by the shock absorber rolls over an uneven ground contour, is always in another stroke positions, whereby the shock absorber is also always in another stroke position, when the shock absorber is retracting by a stroke excitation.

The same function manners are true in the extension phase analogue for the rebound stage of the shock absorber according to another aspect of the invention, when the movement stage is used as rebound stage throttle.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
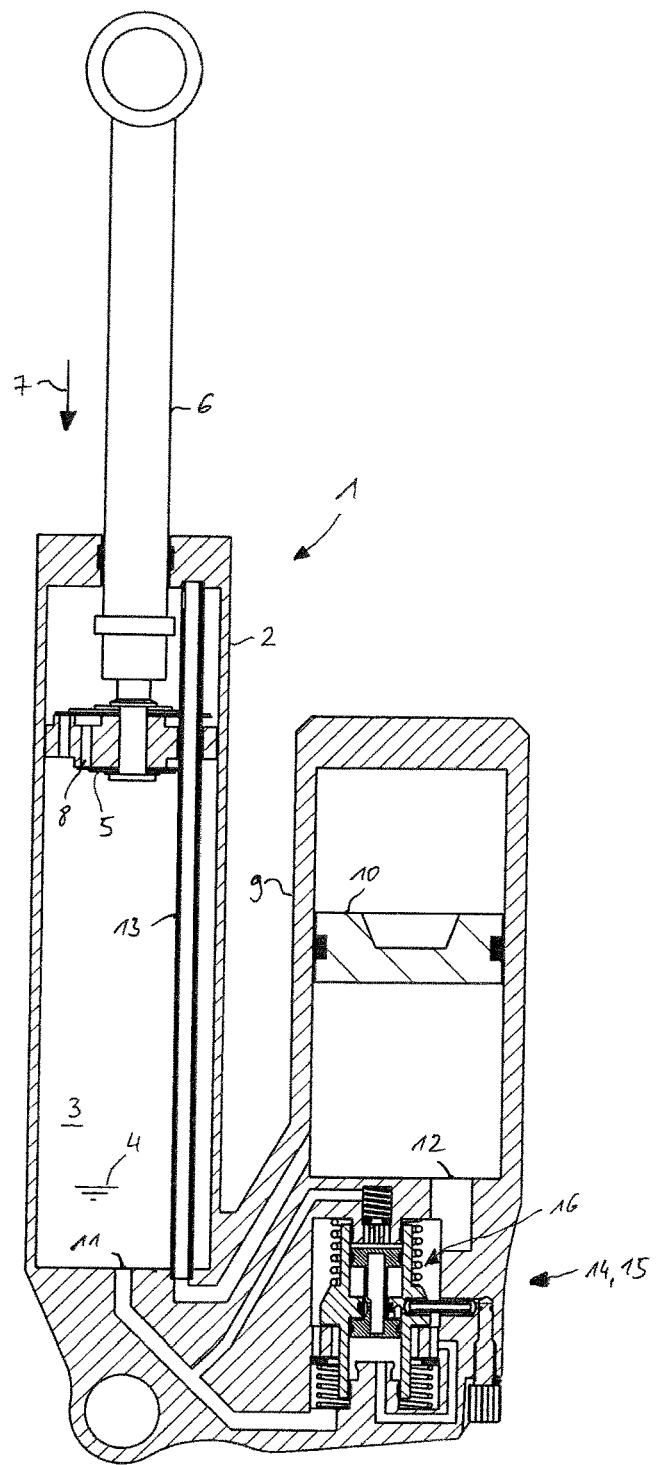
FIG. 1 is a cross-section view of the shock absorber with the first alternative movement stage utilized as a compression stage according to an example embodiment of the invention.
Figure 2:
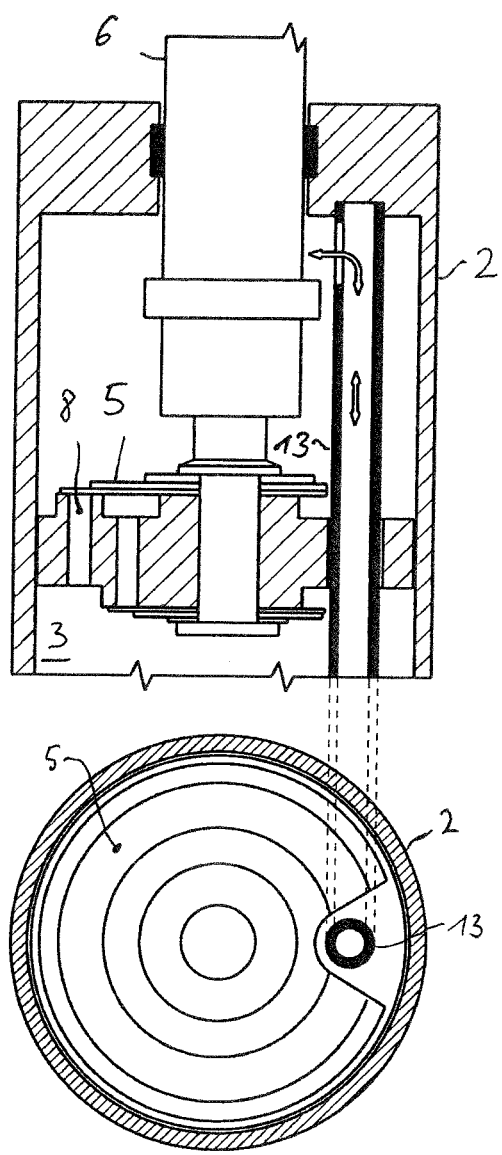
FIG. 2 is a more detailed view of a shock absorber cylinder shown in FIG. 1 according to an example embodiment of the invention.
Figure 3:
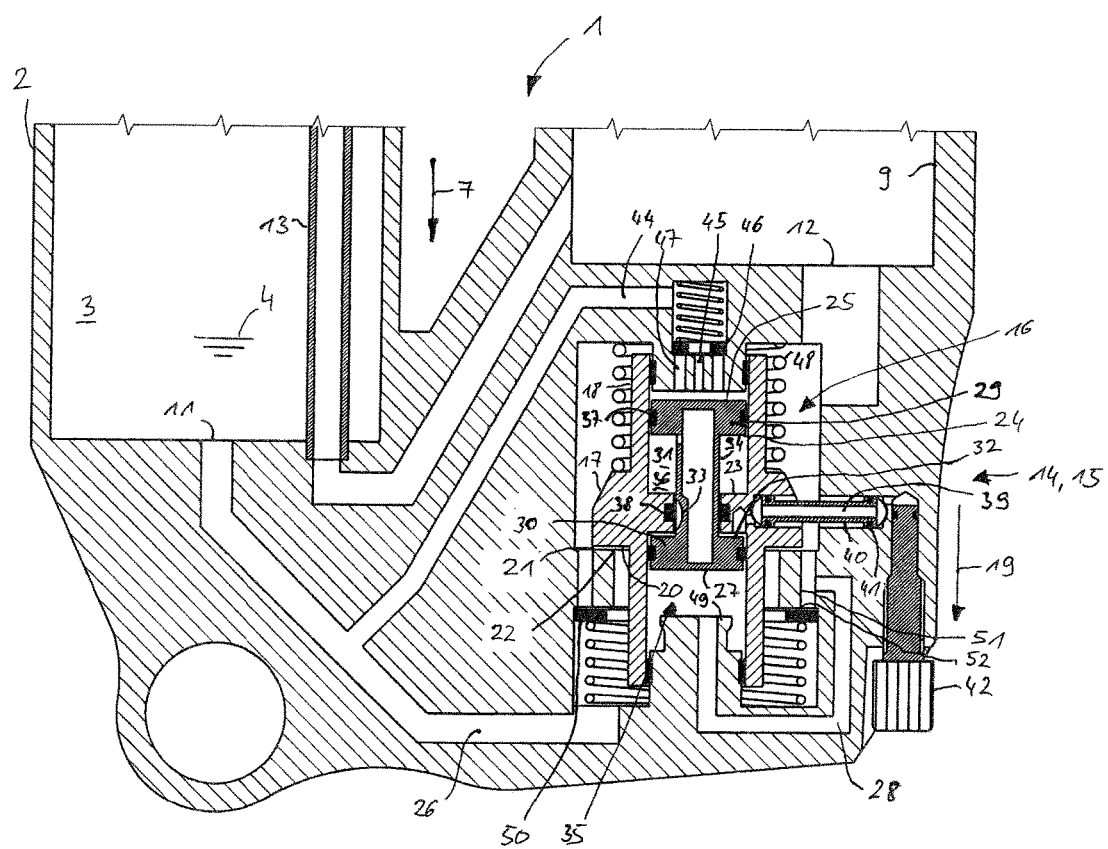
FIG. 3 is an extract of the cross-section view of FIG. 1.

In FIGS. 1 to 3, a shock absorber 1 is shown. The shock absorber 1 has a shock absorber cylinder 2. A damping volume 3 is provided in the shock absorber cylinder 2, wherein the damping volume 3 is filled with a damping fluid 4, in particular with damping oil. A shock absorber piston 5 is arranged such that it can be displaced longitudinally in the damping volume 3, wherein the shock absorber piston 5 can be operated from outside the shock absorber cylinder 3 by a piston rod 6. If the shock absorber piston 5 is displaced longitudinally in the shock absorber cylinder 2 so that the piston rod 6 extends into the damping volume 3, the shock absorber 1 is retracted, wherein the retraction direction is indicated in FIG. 1 with an arrow 7.

The damping volume 3 is divided in two halves by the shock absorber piston 5, wherein during the displacement of the shock absorber piston 5 one half of the damping volume 3 becomes smaller and another half of the damping volume 3 becomes correspondingly larger. A damping opening 8 is provided in the shock absorber piston 5, wherein the displaced damping fluid 4 can flow from the one half of the damping volume 3 to the other half of the damping volume 3 through the damping opening 8. Since the through flowing of the damping opening 8 generates losses in the damping fluid flow, a respective shock absorber resistance force results, wherein the shock absorber resistance force counteracts the movement of the shock absorber piston 5.

At different stroke positions of the shock absorber piston 5, the piston rod 6 extends differently long in the damping volume 3, whereby an accordingly unequal displacement of the damping fluid 4 by the piston rod 6 is involved. The shock absorber 1 has a compensation volume reservoir 9 for the compensation of this unequal displacement effect of the piston rod 6, wherein a compensation piston 10 is arranged in the compensation volume reservoir 9 such that it can be displaced longitudinally. An entry opening 11 is provided in the shock absorber cylinder 2 and an exit opening 12 is provided in the compensation volume reservoir 9, wherein the damping fluid 4 is channeled in during the retraction of the shock absorber 1 in the retraction direction 7 and is channeled out during the extension against the retraction direction 7 through the openings 11, 12 according to the displacement effect of the piston rod 6 by displacing the compensation piston 10. The compensation piston 10 is impinged on its side that faces away from the damping fluid 4 by a pressurized gas cushion, so that the damping fluid 4 is always exposed to a hydrostatic bias pressure. An ascending pipe 13 arranged in the damping volume 3 extends from the compensation volume reservoir 9 through the shock absorber piston 5 to the half of the damping volume 3 that is the other half to the half in which the entry opening 11 is provided. The ascending pipe 13 extends through the shock absorber piston 5, so that the shock absorber piston 5 can be displaced longitudinally along the ascending pipe 13. The ascending pipe 13 has an opening in the half of the damping volume 3, to which the piston rod 6 extends, so that the damping fluid 4 can flow from the one half of the damping volume 3 to the other half of the damping volume 3 through the entry opening 11 via the compensation volume reservoir 9 and the ascending pipe 13.

In FIGS. 1 and 3, a compression stage 14 is illustrated a first alternative movement stage according to a first example embodiment of the invention. The compression stage 14 is formed by a stage throttle 15 that is arranged between the entry opening 11 and the exit opening 12. The amount of the damping fluid 4 that flows from the one half of the damping volume 3 to the other half of the damping volume 3 flows through the stage throttle 15 a the shock absorber 1 moves. The flowing of the damping fluid 4 involves flow losses, so that the shock absorber resistance force is also determined by the flow conditions prevailing in the stage throttle 15.

The stage throttle 15 has a disk valve 16 that is built in the shock absorber 1 such that the disk valve 16 is in an open condition and therefore flown through by the damping fluid 4 during a retraction of the shock absorber 1 in the retraction direction 7, it is in a closed condition and therefore not flown through by the damping fluid 4 during the extension of the shock absorber 1 opposite to the retraction direction 7. The disk valve 16 has a valve disk 17 that is arranged in the shock absorber 1 such that it can be displaced longitudinally on a valve shaft 18. The valve disk 17 is moved in its closing direction 19 until the valve disk 17 lies on a disk valve seat 21 of the disk valve 16 in order to bring the disk valve 16 in its closed condition. In order to bring the disk valve 16 from the closed condition in its open condition, the valve disk 17 is raised from the disk valve seat 21 opposite to the closing direction 19, whereby a through flow opening is formed between the disk valve seat 21 and the valve disk 17, wherein the damping fluid 4 flows through the through flow opening during the retraction of the shock absorber 1. The position of the through flow opening of the disk valve 16 marks an entry edge 22 of the disk valve seat 21, wherein the significant pressure drop arises on the entry edge 22 during the through flowing of the through flow opening of the disk valve 16 by the damping fluid 4. The portion of the damping fluid 4 that is located upstream of the entry edge 22 has therefore a total pressure that is higher by the pressure drop on the entry edge 22 than the portion of the damping fluid 4 that is located downstream of the entry edge 22 and has already passed the entry edge 22. The portion of the surface of the valve disk 17 that is impinged upstream of the entry edge 22 by the damping fluid 4 flown out of the damping volume 3 is denoted as valve disk pressure surface 20.

The valve shaft 18 is formed as a hollow cylinder, wherein the valve disk 17 is attached on an outside of the valve shaft 18. Inside of the valve shaft 18, a protrusion 23 extends radial from the valve shaft 18, wherein the protrusion 23 is arranged on the height of the valve disk 17. The protrusion 23 is formed in a shape of a ring, so that an opening is formed by the protrusion 23 in the center around the longitudinal axis of the valve shaft 18, wherein an analogue piston 24 is arranged in the opening such that it can be displaced along the longitudinal axis of the valve shaft 18. The analogue piston 24 is formed in the manner of a double hammer head and has a first piston head 29 and a second piston head 30, wherein the piston heads 29, 30 are held in a distance to one another by a piston shaft 34 that is arranged between the piston heads 29, 30. The piston shaft 34 is engaged with the opening formed by the protrusion 23, wherein, seen in the closing direction 19 of the disk valve 16, the first piston head 29 is arranged on the other side of the protrusion 23 and the second piston head 30 is arranged on this side of the protrusion 23. The piston heads 29, 30 are arranged on the inner side of the valve shaft 18 such that they can be displaced longitudinally and are sealed to the valve shaft 18 with a damping fluid seal 37. A first chamber 31 is formed between the first piston head 29 and the protrusion 23 and a second chamber 32 is formed between the second piston 30 and the protrusion 23, wherein the chambers 31, 32 are filled with a gas 36. A gas seal 38 is provided on the side of the protrusion 23 facing towards the valve shaft 18, wherein the first chamber 31 is sealed in a gas sealed manner from the second chamber 32 by the gas seal 38. Further, a connection recess 33 is arranged in the piston shaft 34, wherein, when the analogue piston 24 is in a first extreme position, the gas seal 38 is bridged via the connection recess 33, so that the first chamber 31 is connected in a gas conductive manner with the second chamber 32 via the connection recess 23. A bias force can be brought on the valve disk 17 via the protrusion 23 because of the different gas pressures in the chambers 31, 32, so that the chambers 31, 32 act as a gas spring 35.

The first piston head 29 has a side facing away from the first chamber 31, wherein the side is denoted as an analogue first piston pressure surface 25. The second piston head 30 has a side facing away from the second chamber 32, wherein the side is denoted as an analogue piston counter surface 27. The shock absorber 1 has a damping fluid channel 44 that guides the damping fluid 4 from the entry opening 11 upstream of the entry edge 22 to the analogue piston pressure surface 25. Further, the shock absorber 1 has a counter channel 28 that guides damping fluid 4 from upstream of the entry edge 22 to the analogue piston counter surface 27. Since the analogue piston pressure surface 25 and the analogue piston counter surface 27 are arranged to face away from each other and since the analogue piston counter surface 27 is impinged by damping fluid 4 that has already passed the entry edge 22 of the disk valve seat 21, and since the analogue piston pressure surface 25 is impinged by the damping fluid 4 that has not yet passed the entry edge 22 of the disk valve seat 21, the pressure difference that arises on the disk valve seat 21 during flowing through of the disk valve 16 acts on the analogue piston 24.

The shock absorber 1 further includes a stop 49 that is fixed on the shock absorber cylinder 2, wherein the analogue piston 24 is arranged on the stop 49, when the analogue piston 24 is in a second extreme position. The stop 49 is particularly preferred arranged in such a position that the valve disk 17 in the second extreme position of the analogue piston 24 can still perform its complete valve stroke under an elastic bias by the biasing means 35, 43. It is therefore required that in this position a remaining stroke of the biasing means 35, 43 is still available, wherein the remaining stroke is at least as high as the valve stroke of the valve disk 17. In the second extreme position, the analogue piston 24 is displaced in the valve shaft 18 such that the gas seal 38 is no longer bridged by the connection recess 23 and the pressure in the first chamber 31 is larger than in the second chamber 32, wherein the bias force acting from the gas spring 35 on the valve disk 16 has a maximum value. In contrast thereto, in the first extreme position of the analogue piston 24, the first chamber 31 is connected with the second chamber 32 via the connection recess 33, so that the same gas pressure prevails in both chambers and the bias force acting from the gas spring 35 on the valve disk 17 is therefore zero.

Projected in the closing direction 19 of the disk valve 16, the analogue piston pressure surface 25 is larger than the valve disk pressure surface 20, so that a movement of the analogue piston 24 from the first extreme position in the second extreme position is initiated during the retraction of the shock absorber 1 in the retraction direction 7, wherein the bias of the valve disk 17 by the biasing means 35, 43 remains always elastic, since the elastic biasing means 35, 43 always comprises a remaining stroke also in the second extreme position of the analogue piston 24, wherein the remaining stroke is at least as high as the complete valve stroke of the valve disk 17. According to the embodiment shown in FIGS. 1 and 3, the ratio of the analogue piston pressure surface 25 to the valve disk pressure surface 20 is 1.8.

The damping fluid seal and the gas seal 38 are formed as slip rings, in particular as O-rings. The damping fluid 4 is sealed against the gas 36 by the damping fluid seal 37, whereas the gas 36 of the first chamber 31 is sealed against the gas 36 of the second chamber 32 by the gas seal 38. Therefore, the contact pressure of the gas seal 38 against the inner side of the protrusion 23 is higher than the contact pressure of the damping fluid seal 37 against the inner side of the valve shaft 18. During breaking free of the analogue piston 24 during its movement from the first extreme position to the second extreme position, the static friction on the damping fluid seal 37 and the gas seal 38 has to be overcome. Since the analogue piston 24 is displaced in the closing direction 19 of the disk valve 16 during this movement, the breaking free force of the analogue piston 24 lying on the valve disk 17 acts in the closing direction 19 of the disk valve 16. The valve disk 17 is therefore pressed on the disk valve seat 21 by the analogue piston 24 immediately at the start of the retraction of the shock absorber 1, whereby the disk valve 16 is held in a stable position in particular with the minimum bias of the valve disk 17 being present at the start of the retraction of the shock absorber 1. Otherwise, the valve disk 17 would run into danger to be raised due to the low bias at the start of the retraction of the shock absorber 1, respectively to vibrate uncontrollably, whereby a pressure rise on the valve disk 17 initiating the movement stage could even not occur sufficiently and the analogue piston 24 would therefore not be displaced in direction of the biasing means. This is in particular true, if the breaking free forces and friction forces of the seals 37, 38 of the analogue piston 24 would be directed in the opening direction of the valve disk.

Since the elastic biasing means 35, 43 is spatially isolated from the damping fluid 4 that has not yet passed the entry edge 22 of the disk valve seat 21 together by the analogue piston 24 and by the valve disk 17, a biasing means 35, 43 is sufficiently long and therefore has a long stroke in shape of, for example, the shown coil spring or gas spring. The biasing means 35, 43 has, for example, a stroke that is larger than the complete valve stroke of the valve disk 17 or the biasing means 35, 43 has by its length a force-distance-characteristic curve that is substantially constant over the valve stroke in the range of the valve stroke. A first derivative of the force-distance-characteristic curve is substantially zero ($F'=dF/dx \approx 0$) in the range of the valve stroke, and can be employed in the first place, since these biasing means can not ensure the spatial separation of the portion of the damping fluid 4 that has not (or not yet) passed the entry edge 22 of the disk valve seat 21 from the portion of the damping fluid 4 that has already passed the entry edge 22 of the disk valve seat 21 alone due to their geometric shape. But this is necessary for a pressure rise on the disk valve 17. Thus, the elastic biasing means 35, 43 further remains shielded from the pressure difference of this both portions of the damping fluid, whereby the elastic biasing means 35, 43 is not exposed to a further force than by the analogue piston 24, whereby it remains particularly advantageous always unchanged in its characteristic according to an example embodiment of the invention.

Figure 6:
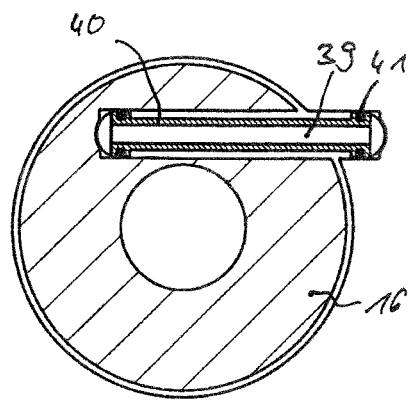
FIG. 6 shows a disk valve according to an example embodiment of the invention.
Figure 7:
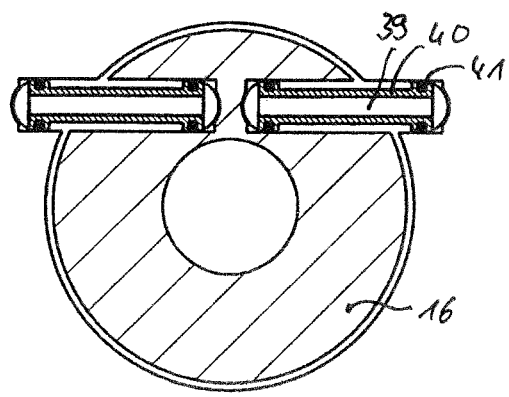
FIG. 7 shows another disk valve according to an example embodiment of the invention.

An access channel 39 ends in the first chamber 32, wherein a pipe piece 40 is inserted in the access channel 39, wherein the pipe piece 40 has on its longitudinal ends a respective tilt seal 41 (see FIGS. 6 and 7). The access channel 39 extends in the shock absorber cylinder 2 with its first portion and in the valve disk 17 with its second portion, so that the both portions of the access channel 39 are moved relative to each other during a movement of the valve disk 17. Both portions are bridged by the pipe piece 40, wherein the pipe piece 40 is supported in the access channel 39 by the tilt seals 41 such that it can tilt. The access channel 39 is closed towards the outside by a pressure adjustment screw 42, wherein a volume change of the access channel 39 can be set by an operation of the pressure adjustment screw 42. The size of the common volume that is formed by the first chamber 32 together with the access channel 39 can therefore be changed by the pressure adjustment screw 42. The level of the pressure in the common volume and the size of the common volume determine the characteristic of the gas spring 35 and therefore also the damping force of the movement stage. This can be carried out, as shown, manually by the pressure adjustment screw 42 on the shock absorber or, for example, remote controlled by the rider on the handlebar of the bicycle, for example in form of a riding experience switch, or also automatically, for example, controlled by a sensor system-control electronics-actuator system, based on stored characteristic maps and characteristic lines and dependent on diverse influence variables like the riding velocity of the bicycle, the wheel or frame accelerations of the bicycle, the overdriven ground profile, a longitudinal inclination of the bicycle, et cetera.

A cross-section reduction 45 is built in the damping fluid channel 44, wherein the cross section reduction 45 is furthermore provided with a back flow valve 46 and a back flow bypass 47. The cross-section reduction 45 becomes active when the damping fluid 4 flows from the entry opening 11 through the damping channel 44 to the analogue piston pressure surface 25. The pressure rise on the analogue piston pressure surface 25 is therefore reduced, whereby the movement velocity of the analogue piston 24 is reduced. The back flow valve 46 gets into its open position during the extension of the shock absorber 1, whereby the back flow bypass 47 is laid open, so that the cross-section reduction 45 is made effectless and the damping fluid 4 can flow from the analogue piston pressure surface 25 possibly low of losses and therefore fast via the entry opening 11 back in the damping volume 3. The time duration of the movement of the analogue piston can be set by switching between different large cross-section reductions 45, for example, by a revolver nozzle (not shown) or by a cross-section reduction 45 that is adjustable in its effective cross-section (not shown). This can be carried out manually on the shock absorber or, for example, remote controlled by the rider on the handlebar of the bicycle, for example by using a riding experience switch, or also automatically, for example, controlled by a sensor system-control electronics-actuator system, based on stored characteristic maps and characteristic lines and dependent on diverse influence variables like the riding velocity of the bicycle, the wheel or frame accelerations of the bicycle, the overdriven ground profile, the longitudinal inclination of the bicycle, et cetera.

Further, according to an example embodiment of the invention, an extra spring 48 is provided that is supported on the shock absorber cylinder 2 and on the valve disk 17, wherein the valve disk 17 is biased in its closing direction by the extra spring 48. The disk valve 16 has a support ring 51 that is centrically arranged around the axis of the valve disk 17. The disk valve seat 21 is formed on one front end of the support ring 51, so that the inner edge forms the entry edge 22 of the disk valve seat 21 on the respective side of the support ring 51. A non-return valve seat 52 is arranged facing away from the respective front end, wherein a non-return valve 50 is arranged on the non-return valve 52, wherein the non-return valve 50 is formed by a ring disk that is biased with a spring. A sealing of the support ring 51 against the shock absorber cylinder 52 is achieved by the ring disk, wherein the non-return valve 50 is in its closed position during the retraction of the shock absorber 1 and in its open position during the extension of the shock absorber 1.

Figure 4:
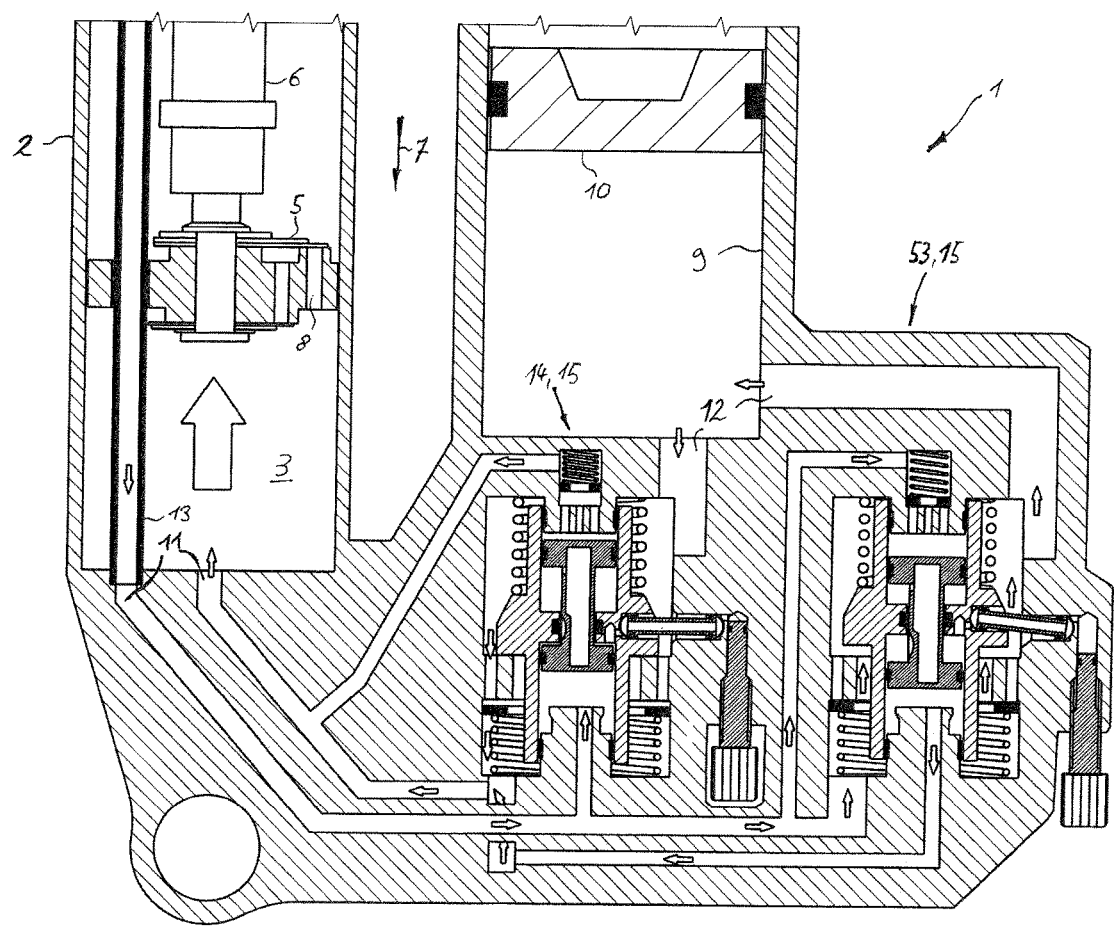
FIG. 4 shows an extract of a cross-section illustration of the shock absorber with two first alternative movement stages according to an example embodiment of the invention, in which one movement stage is a compression stage and another movement stage is a rebound stage.

The shock absorber 1 shown in FIG. 4 has a compression stage 14 and a rebound stage 53 interconnected in parallel to the compression stage 14, wherein the rebound stage 53 is identically constructed as the compression stage 14, whereas the rebound stage 14 is built in the shock absorber 1 such that the rebound stage 53 has the same functionality during the extension of the shock absorber 1 as the compression stage 14 during the retraction of the shock absorber 1. The shock absorber 1 shown in FIG. 4 is retracting. The rebound stage is damping. The large arrow in the damping volume 3 shows the movement direction of the damping piston 5. The small arrows in the piping of the movement stages show the current flow of the damping fluid 4 during an active rebound stage 53. The analogue piston 24 of the compression stage 14 has already moved back to its first extreme position, that is, the starting position before the next retraction process. During the shown retraction process of the shock absorber 1, the elastic biasing means 35, 43 is maximally relaxed, whereas the analogue piston 24 of the rebound stage 53 is on its way to its second extreme position. The elastic biasing means 35, 43 is continually further biased, wherein also the bias force of the valve disk 17 is also increased against the disk valve seat 21. The movement stages of the rebound stage 53 and the compression stage 14 are advantageously coupled with each other, as shown in FIG. 4, so that the damping fluid 4 that (flowing from the damping volume 3) has not yet passed the entry edge 22 of the disk valve seat 21 of the compression stage 14 during the retraction of the shock absorber 1 which also acts on the analogue piston counter surface 27 of the rebound stage 53. FIG. 4 also shows that the damping fluid of the rebound stage 53, which (flowing from the ascending pipe 13) has not yet passed the entry edge 22 of the disk valve seat 21 of the rebound stage during the retraction of the shock absorber 1, also acts on the analogue piston counter surface 27 of the compression stage 14. As a tenet, during a terrain ride with always successive retraction and extension processes of the shock absorber 1, in addition to the reset force of the elastic biasing means 35, 43 of the current inactive movement stage (for example, the rebound stage during the retraction), also the pressure of the damping fluid 4, which is generated by the pressure drop on the valve disk 17 of the respective other, current active movement stage (for example, the compression stage 15 during the retraction), is present on the analogue piston counter surface 27 of the analogue piston 24 of the inactive movement stage, and therefore displaces the analogue piston 24 in its first extreme position, and therefore supports the elastic biasing means 35, 43 of the current inactive movement stage with its relaxation until it is reset in the first extreme position of the analogue piston 24 to its starting value. The small amount of the damping fluid 4 required thereto, which has not yet passed the entry edge 22 of the disk valve seat 21 of the current active movement stage, bypasses the disk valve seat 21 and the valve disk 17 of the current active movement stage. The piston rod 6 of the shock absorber 1 can therefore slightly move, although the valve disk 17 of the current active movement stage that is biased by the extra spring 48 has not yet opened. The force for moving the analogue piston 24 of the inactive movement stage in a direction to its first extreme position (and therefore for moving further the piston rod 6) continually and smoothly increases, since the elastic biasing means of the movement stage increasingly relaxes, whereby it decreasingly contributes to the reset force of the analogue piston 24, whereby also the pressure of the damping fluid 4 on the valve disk pressure surface 20 of the valve disk 17 of the current active movement stage continually smoothly increases until the current bias force of the biasing means 35, 43 and of the extra spring 48 of the valve disk 17 is overcome and the disk valve opens. According to an example embodiment, the shock absorber 1 has a significantly improved response behavior to excitations to tiniest unevenesses of the ground during an arbitrary change between retraction and extension movement. This is particularly true, if it deals with vibrations, high frequent excitations and therefore strokes of the piston rod 6 that are of such a short amplitude that the valve disks 17 of both movement stages 14, 53 do not even open.

Figure 5:
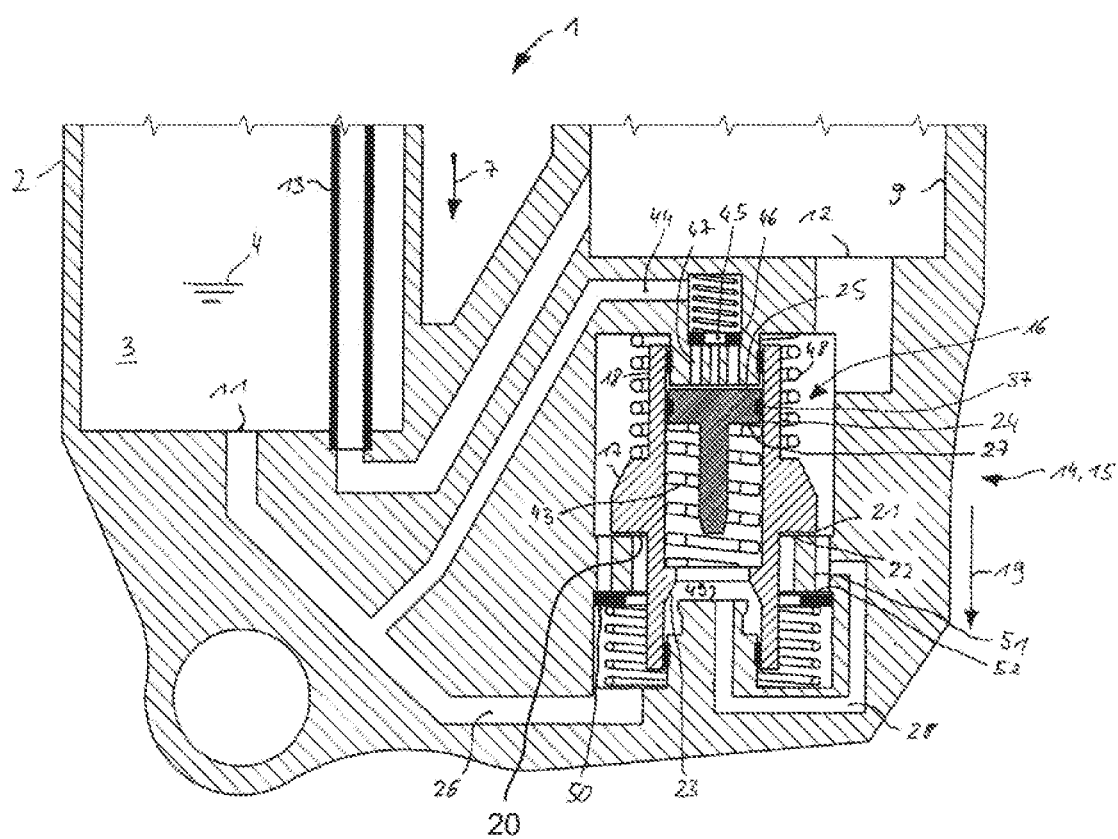
FIG. 5 is an extract of a cross-section view of a shock absorber with the first alternative movement stage according to a second example embodiment of the invention configured as a compression stage.

In FIG. 5, a second example embodiment of the first alternative compression stage 14 is shown. The second example embodiment differs from the first example embodiment that is shown in FIGS. 1 and 3 in that a biasing spring 43 in a shape of a coil spring made of a flat material is provided instead of the gas spring 35. The piston heads 29, 30 of the analogue piston 24 are formed to a single piston head from which a pin is provided for lying on the stop 49 in the second extreme position.

In FIGS. 6 and 7, a gas conducting pipe piece 40 is shown with two tilt seals 41 and an access channel 39. The pipe piece 40 ensures a gas conductive connection of the first chamber 31 and/or the second chamber 32 in the disk valve 16 that has an extremely low friction with the part of the access channel 39 of the pressure adjustment screw 42 that is attached in the access channel, wherein the access channel 39 is provided in the shock absorber body, and with a filling valve (not shown) connected in a gas conductive manner with the channel 39, while the disk valve 16 moves up and down by its closing and opening movements.

FIG. 6 shows a disk valve 16 which is connected only via a pipe piece 40 with the shock absorber body in a gas conductive and movable manner. Ideally, the pipe piece is thereby slightly shifted to the axis of the disk valve 16 towards the outside, as can be seen in the cross-section view of FIG. 6. The static pressure of the damping fluid 4 surrounds the disk valve 16, wherein the pressure is, for example, brought up by the compensation piston 10. The pressure has thereby to be always higher than the pressure in the access channel 39 in order to prevent the pipe piece 40 from dropping out of its pockets in the disk valve 16 and in the shock absorber body. The disk valve 16 with the front wall of its pocket is pressed against the spherical end of the pipe piece 41 by an overpressure, whereby the pipe piece with its other spherical end is pressed on the front end of the pocket of the shock absorber body. If the disk valve 16 opens, the position of the pipe piece 41 is slightly inclined, whereby the disk valve 16 has to slightly rotate around its axis due to the overpressure, in order to remain pressed on the spherical end of the pipe piece 40, whereby it compensates the shortening of the pipe piece 40 due to its inclined position. The pipe piece 40 behaves like a connection rod that is tilting three-dimensionally, wherein the connection rod supports the rotational momentum of the disk valve 16 around its axis. The friction forces generated by the tilt seals 41 are, in relation to the tilting direction of the pipe piece, almost negligible. Even when tightly seated, the forces on the slideway of the disk valve 16 in the shock absorber body are also minimal due the connection rod function of the pipe piece 40 and the compensation rotation of the disk valve 16, whereby only smallest friction forces result in the opening and closing direction of the disk valve 16. In FIG. 7, two pipe pieces 40 are arranged opposite to one another. The first chamber 31 is connected in a fluid conductive manner to the shock absorber body by one of the pipe pieces. The second chamber 32 is connected in a fluid conductive manner to the shock absorber body by the second pipe piece 40. The pressure in one or in both pipe pieces 40 becomes higher than the static pressure of the damping fluid 4, since the disk valve 16 can be supported alternating on one of the both pipe pieces 40. It is not absolutely required that both pipe pieces 40 are provided with an access channel 39 and the tilt seals 41. Instead, only one pipe piece 40 is necessary for the gas conduction.

Figure 8:
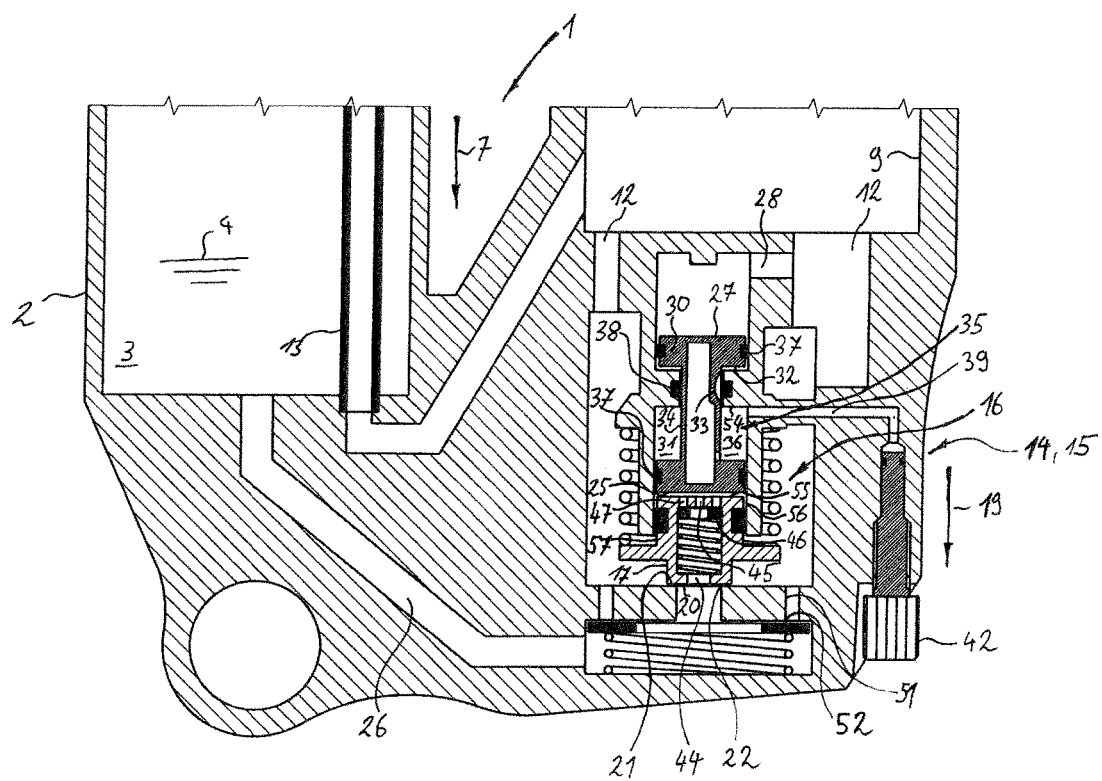
FIG. 8 is an extract of a cross-section view of the shock absorber with the second alternative movement stage configured as a compression stage according to the first example embodiment of the invention.
Figure 9:
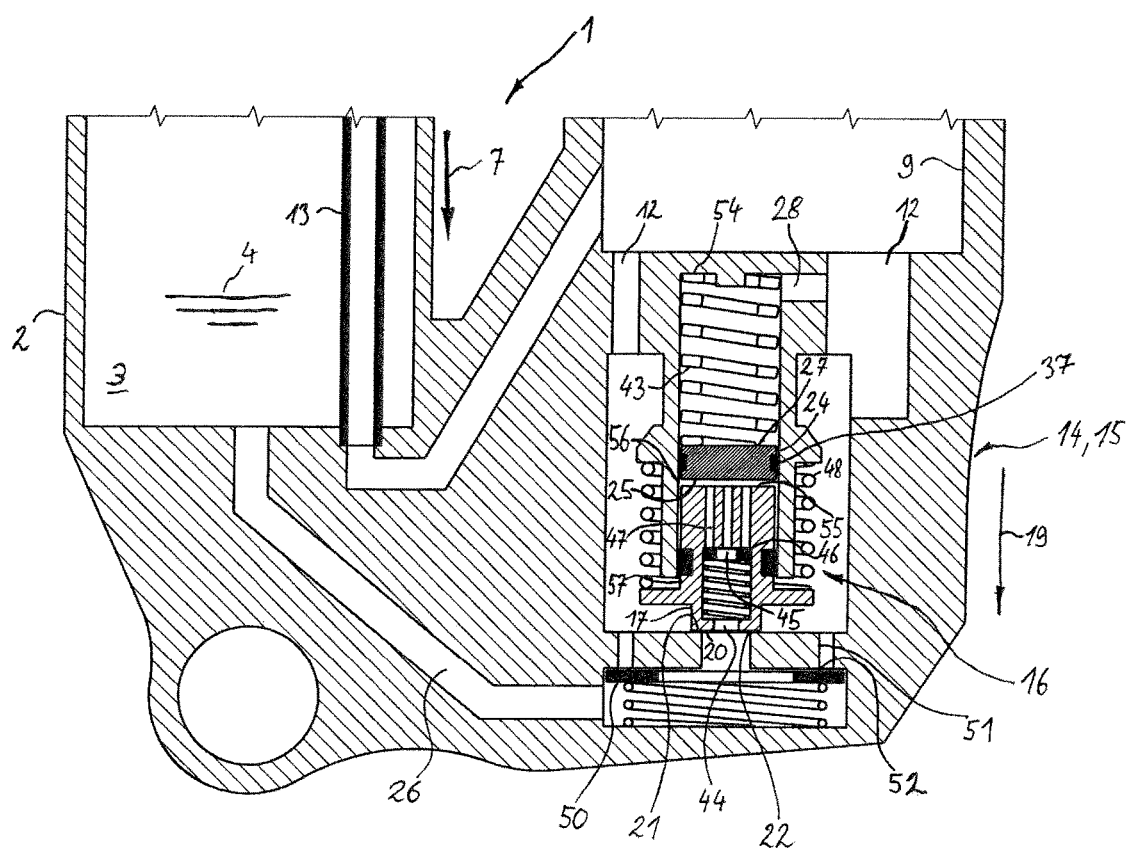
FIG. 9 is an extract of a cross-section view of the shock absorber with the second alternative movement stage configured as a compression stage according to a second example embodiment of the invention.

FIG. 8 shows the shock absorber 1 with a compression stage 14 of a first example embodiment of the second alternative movement stage. FIG. 9 shows a shock absorber 1 with the compression stage 14 of a second example embodiment of the second alternative movement stage. The compression stage 14 of the second alternative movement stage according to the second example embodiment of the invention differs from the compression stage 14 of the first alternative movement stage according to the first example embodiment of the invention in that the analogue piston pressure surface 25 of the analogue piston 24 is arranged to face away from the gas spring 25, and respectively, from the biasing spring 43, and the valve disk pressure surface 20 of the valve disk 17 covers a portion of the surface of the valve disk 17 that is arranged upstream of the entry edge 22 of the disk valve seat 21. Further, the valve disk 16 of the compression stage 14 of the second alternative movement stage according to the second example embodiment of the invention has a valve disk piston surface 55 that is arranged to face away from the valve disk pressure surface 20, wherein the valve disk pressure surface 20, the valve disk piston surface 55, and the analogue piston pressure surface 25 are impinged by the damping fluid 4 flowing out of the damping volume 3 as the shock absorber 1 moves in the retraction direction 7. As a result, the gas spring 25, and respectively the biasing spring 43, is coupled with the disk valve 16 via the analogue piston 24 and the damping fluid 4 that has not yet passed the entry edge 22 of the disk valve seat 21 over the valve disk piston surface 55. The valve disk piston surface 55, projected in the closing direction 19 of the disk valve 16, is larger than the valve disk pressure surface 20, and since the analogue piston pressure surface 25 and the analogue piston counter surface 27 are arranged to face away from each other, since the analogue piston counter surface 27 is impinged by the damping fluid 4 that has already passed the entry edge 22 of the disk valve seat 21, and since the analogue piston pressure surface 25 and the valve disk piston surface 55 are impinged by the damping fluid 4 that has not yet passed the entry edge 22 of the disk valve seat 21, the pressure difference that arises on the disk valve seat 21 during the flowing of the damping fluid through the disk valve 16 acts on the analogue piston 24 and on the valve disk piston surface 55. As a result, the analogue piston 24 is displaced in a direction toward the gas spring 25, and respectively toward the bias spring 43, during the retraction of the shock absorber 1 and the bias force of the valve disk 17 thereby increases, wherein the bias of the valve disk 17 by the biasing means remains always elastic during the movement of the analogue piston.

The shock absorber cylinder 2 of the compression stage 14 of the second alternative movement stage according to the second example embodiment of the invention shown in FIGS. 8 and 9 has a hollow cylinder 56 that is filled with damping fluid 4 that has already passed the entry edge 22 of the disk valve seat 22. The analogue piston 24 is arranged in the hollow cylinder 56 such that it can be displaced longitudinally. The valve disk 17 has a piston stump 57 that is arranged in the hollow cylinder 56 such that it can be displaced longitudinally. For the compression stage 14 of the first example embodiment of the second alternative movement stage shown in FIG. 8, the protrusion 23 is arranged on the inner side of the hollow cylinder 56. Moreover, the compression stage 14 of the second embodiment of the second alternative movement stage shown in FIG. 9 has a support seat 54 that is arranged to face away from the piston stump 57, wherein the biasing spring 43 is supported on the support seat 54.

The damping fluid seal 37 and the gas seal 38 are formed as slip rings, in particular as O-rings. The damping fluid 4 is sealed against the gas 36 by the damping fluid seal 37, whereas the gas 36 of the first chamber 31 is sealed against the gas 36 of the second chamber 32 by the gas seal 38. During breaking free of the analogue piston 24 on its movement from the first extreme position to the second extreme position, the static friction on the damping fluid seal 37 and the gas seal 38 has to be overcome. Since the breaking free force of the analogue piston 24 in the closing direction 19 of the disk valve 16 acts during this movement (transmitted from the analogue piston pressure surface 25 to the valve disk piston surface 55 via the damping fluid 4 being present between these two surfaces), the valve disk 17 is pushed by the analogue piston 24 toward the disk valve seat 21 immediately at the start of the retraction of the shock absorber 1, whereby the disk valve 16 is held in a stable position, in particular with a minimal bias of the valve disk 17 being present at the start of the retraction of the shock absorber 1. Otherwise, the valve disk 17 would run into danger to be raised due to the low bias at the start of the retraction of the shock absorber 1, respectively to vibrate uncontrollably, whereby a pressure rise on the valve disk 17 initiating the movement stage could even not occur sufficiently and the analogue piston would therefore not be displaced in the direction of the biasing means. This is in particular true, if the breaking free forces and friction forces of the seals 37, 38 of the analogue piston 24 act in the opening direction of the valve disk.

In contrast to the first alternative movement stage, the pressure of the damping fluid 4 rises abruptly and therefore the damping force rises abruptly, when the analogue piston 24 of the second alternative movement stage reaches its stroke end, independent from the analogue piston 24 being supported on the biasing means 35, 43 or on a stop 49, since the pressure of the damping fluid 4 that has not yet passed the entry edge 22 of the disk valve seat 21 still acts on the valve disk piston surface. This makes a stop 49, having the same effect as the stop 49 of the first alternative movement stage, impossible. An equal effect as the stop 49 of the first alternative movement stage can be achieved for the second alternative movement stage by building a spring biased closed bypass valve, for example, in the shock absorber piston 5, wherein the bypass valve bridges the movement stage by overcoming the bias force of the bypass valve, as a desired maximum value of the pressure of the damping fluid 4 (and therefore of the damping force of the movement stage) is reached, whereby the disk valve 16 is bridged, and whereby the damping force no longer rises (not shown). A further possibility to achieve the equal effect is to interrupt the inflow of the damping fluid 4 through the cross-section reduction 45 in the damping fluid channel 44, as soon as the analogue piston 24 has reached the second extreme position in which the analogue piston 24 is supposed to maximal bias the biasing means 35, 43. This can, for example, be achieved by a control rod (not shown) attached to the analogue piston 24, provided perpendicular to the analogue piston pressure surface 25 and concentric to the lateral surface of the analogue piston 25 and fed through the bore of the cross-section reduction 45, wherein the bore is also arranged in a concentric manner to the lateral surface of the analogue piston 24. The effective cross-section of the cross-section reduction 45 is therefore an annular gap formed by the bore of the cross-section reduction 45 and the thinner control rod fed through the bore. The control rod is thereby formed such that it includes a concentric thickening on its end facing away from the analogue piston, wherein the control rod closes the cross-section reduction 45 with its end facing away from the analogue piston, as the analogue piston 24 has reached the second extreme position. Therefore, the valve disk piston surface 55 is sealed off from the further pressure rise of the damping fluid 4 that has not yet reached the entry edge of the disk valve seat 22, whereby bias forces of the valve disk 17, and therefore the damping forces of the shock absorber 1, do not further rise. It is particularly preferred that still so much remaining stroke in the biasing means 35, 43 is present at the second extreme position of the analogue piston 24 that the valve disk 17 can displace the analogue piston 24 over the damping fluid enclosed between the valve disk piston surface 55 and the analogue piston pressure surface 25 so far that the valve disk 17 is enabled to perform at least its complete valve stroke, whereby the valve disk 17 remains elastically biased by the biasing means 35, 43 at the second extreme position of the analogue piston 24.

Both, the bias of the described bypass valve and the position of the protrusion 23, shown in FIGS. 4 and 5, or also the position of the thickening of the described control rod relative to the cross-section reduction 45 can be set manually on the shock absorber. They can also be remote-controlled by the rider on the handlebar of the bicycle, for example in form of a riding experience switch. In addition, they can be automatically controlled by a sensor system-control electronics-actuator system based on stored characteristic maps and characteristic curves and depending on diverse influence variables like the driving velocity of the bicycle, the wheel or frame accelerations of the bicycle, the overridden terrain profile and/or the longitudinal inclination of the bicycle, et cetera.

Since the analogue piston pressure surface 25 and the analogue piston counter surface 27 of the analogue piston 24 are equally large, the position of the analogue piston 24 in each stroke position of the shock absorber 1 is independent from the hydrostatic bias pressure that is transmitted by the damping fluid 4 to the gas pressurized compensation piston 10 (see description of FIG. 1) and it is therefore also independent from the current stroke position of the shock absorber (this is true for all embodiments of both alternative movement stages, shown in the FIGS. 1, 3, 4, 5). Only in this manner, the valve disk of the shown movement stages can be impinged by an always equal and very low start bias generated by the elastic biasing means 35, 43 during the start of the retraction or the extension of the shock absorber 1, which is necessary for the functioning of the movement stage, current stroke position of the shock absorber 1. If the analogue piston counter surface 27 and the analogue piston pressure surface 25 would be differently large, either the analogue piston 24 can not return to each stroke position of the shock absorber 1 in the start position, the first extreme position, or to the existing bias of the analogue piston 24, which is caused by the above-described hydrostatic pressure of the damping fluid 4. It would even have to be first overcome during the start of the movement process of the shock absorber 1 before the analogue piston 24 would be displaced, whereby a pressure rise on the valve disk 17 initialising the movement stage would not even occur sufficiently, whereby the analogue piston would not be displaced in direction of the biasing means 35, 43, whereby the bias force on the valve disk 17 would not increase.

Since the elastic biasing means 35, 43 is simultaneously spatially isolated by the analogue piston 24 from the damping fluid 4 that has not yet passed the entry edge 22 of the disk valve seat 21, a sufficient long and therefore long-stroke biasing means 35, 43 in a shape, for example, of the shown coil spring or of a gas spring that has a force-distance-characteristic line due to its length, the force-distance-characteristic line is in the range of the valve stroke substantially constant over the valve stroke and therefore the first derivative of the force-distance-characteristic curve in the range of the valve stroke (x) is substantially zero (F'=dF/dx≈0). Such a biasing means can not ensure the spatial separation of the portion of the damping fluid 4 that has not yet passed the entry edge 22 of the disk valve seat 21 from the portion of the damping fluid 4 that has already passed the entry edge 22 of the disk valve seat 21 alone due to the geometric shape of the biasing means. But this is necessary for the pressure rise on the disk valve 17. Further, the elastic biasing means 35, 43 remains so shielded from the pressure difference of these two portions of the damping fluid 4, whereby it is subjected to no further force effect than by the analogue piston 24, whereby it remains always unchanged in its characteristic according to an example embodiment of the invention.

Figure 10:
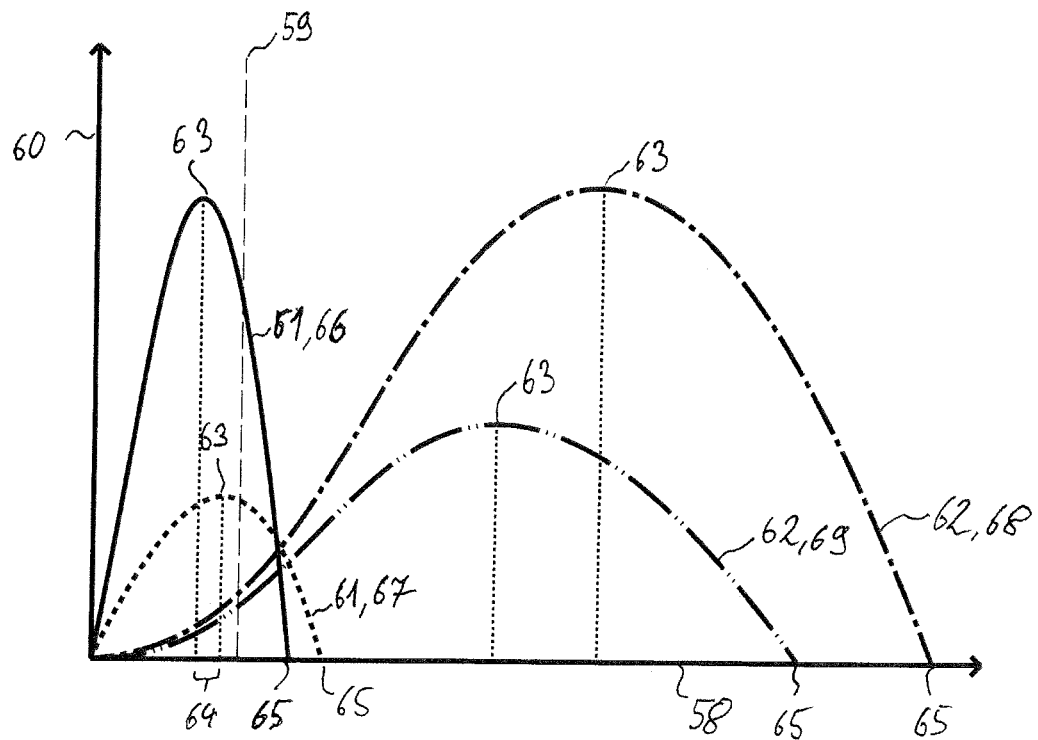
FIG. 10 shows different stroke excitations of the shock absorber with specific excitation durations, stroke amplitudes and stroke velocities, according to an example embodiment of the invention; and, FIG. 11 shows characteristic curves of the damping force of the shock absorber over the retraction stroke, when the shock absorber is exposed to stroke excitations shown in FIG. 10, according to an example embodiment of the invention.

In FIG. 10, the course of various stroke amplitudes of a theoretical, barely damped damping strut on the front wheel of a bicycle is shown over the time axis 58 during stroke excitations acting on the bicycle. The stroke excitations respectively include a stroke excitation maximum 63. During a stroke excitation of the front wheel by obstacles 66, 67, this is during overriding the obstacle maximum by the front wheel, and therefore at a maximum height difference of the obstacle to the level of the road directly surrounding the obstacle, a stroke excitation maximum 63 follows only a short time later, since the barely damped damping strut further compresses shortly after the obstacle maximum is reached due to the mass inertia of the unsprung masses. Each stroke excitation can be divided in two areas: an area before reaching the stroke excitation maximum 56 that deals with a retraction excitation, and an area after reaching the stroke excitation maximum 56 that deals with an extension excitation of the shock absorber. The gradient of the curves represents the respective retraction/extension velocity of the theoretical, barely damped damping strut over the stroke excitation. The different excitation duration of the stroke excitations can be seen in the diagram: over the time axis 39 as the time ray from the intersection point of the axes 58, 60 to the intersection point 65 of the curve of the respective stroke excitation with the time axis 58. It is marked by a reference sign if the respective stroke excitation triggers a desired movement 61 or an undesired movement 62 of the damping strut. It can be seen that stroke excitations by obstacles (curbstone edge 66; lower stone 67) that trigger the desired movements 61 are substantially shorter than stroke excitations that are, for example, induced by braking forces 68 or by pedalling 69 and that trigger undesired movements 62. It is furthermore shown that the excitation duration over diverse obstacle types 59, 60, in particular until the reaching of the obstacle respective stroke excitation maxima 63, is within a temporal very narrow range 64. The reference sign 59 marks a line, wherein the intersection of the line with the time axis 58 represents the end of the period of time that is required by the analogue piston 24 of the shock absorber 1 in order to move from the first to the second extreme position. The preset period of time therefore extends on the time axis 58 from the intersection point of the axes 58, 60 to this point. The intersection point of the line 59 with the respective graphs of the stroke excitations 66, 67, 68, 69 shows, in relation to the type of excitation, at which a current height of the excitation amplitude of the respective stroke excitation the highest damping forces of the shock absorber 1 are reached according to an example embodiment of the invention. It can be clearly recognized that with the stroke excitations 66, 67 that trigger the undesired stroke excitations 61, the highest damping forces are present already at a fraction of the maximum stroke amplitudes, even long before reaching the stroke excitation maxima 63, while during the stroke amplitudes of the desired damping strut movements 61, the damping forces are reached only shortly before reaching the stroke excitation maximum 63 and therefore on the obstacle maximum. If the end of the time duration 59 can only be reached after reaching the stroke excitation maximum 63, the maximum damping forces of the shock absorber 1 are not even reached. Since the force-distance-characteristic line of the biasing means 35, 43 is substantially constant in the range of the valve stroke, the first derivative in this range is substantially zero ($F'=dF/dx \approx 0$), and the damping force is independent from the respective movement velocity of the shock absorber 1, whereby also the pressure drop of the damping fluid 4, which is generated on the valve disk 17, is independent from the movement velocity and therefore also from the force acting on the analogue piston 24, whereby the period of time that the analogue piston 24 requires to move from its first extreme position to its second extreme position and therefore to maximally bias the biasing means 35, 43 is always equally long for all stroke excitations 66, 67, 68, 69 and therefore its end 59 is reached always after the same time after the beginning of the respective stroke excitation 66, 67, 68, 69.

The gradients of the stroke excitations 67 and 68 are equally steep in ranges, whereby also the retraction velocities of the undamped damping strut are almost identical in this ranges of the stroke excitations. Also the amplitudes of the stroke excitations 66 and 68 are approximately equally high. It can therefore well be recognized that neither the stroke amplitudes nor the movement velocities are suitable for distinguishing desired and undesired stroke excitations of the damping strut and accordingly for regulating the damping force. The shock absorber is in its damping force particularly advantageous independent from both the movement velocities and the stroke amplitudes as direct influence factors.

Figure 11:
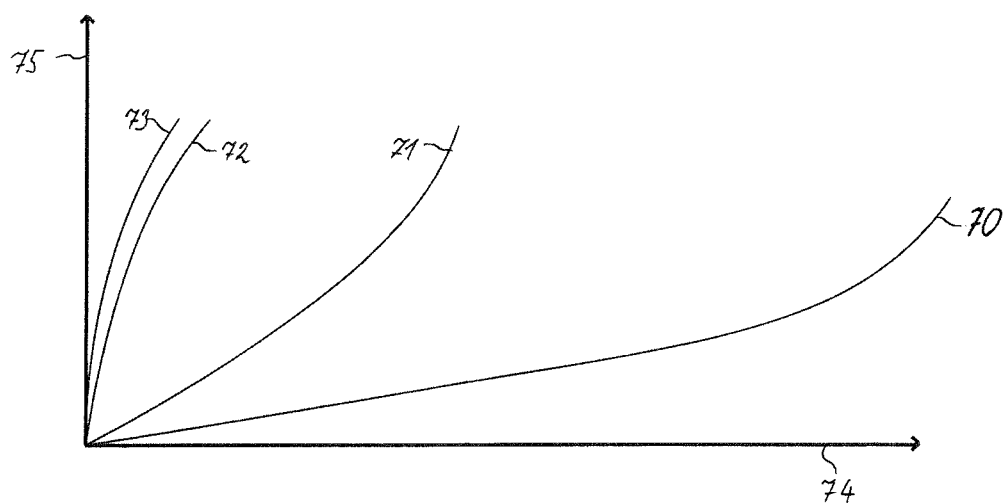

In FIG. 11, the course of the damping force 75 of the shock absorber 1 is plotted over its retraction stroke 74, when the shock absorber 1 is exposed to the different stroke excitations shown in FIG. 10 starting from the beginning of the stroke excitation to the respective stroke excitation maximum. The reference number 70 denotes the damping strut course over the stroke excitation 66 of the curbstone edge, the reference number 71 denotes the damping force course over the stroke excitation 67 of the stone, the reference number 72 denotes the damping force course over the stroke excitation 68 during the braking process, and the reference number 73 denotes the damping strut course over the stroke excitation 69 by pedalling induced rocking. Undesired shock absorber movements are triggered by stroke excitations 68, 69 trigger damping force courses 72, 73 with particularly steep gradients, whereby maximal damping forces are caused already during particularly small retraction strokes.

Desired shock absorber movements that are triggered by the stroke excitations 66, 67 having damping force courses 70, 71 with flat gradients, wherein the damping force courses 70, 71 smoothly rise starting from a minimal starting value. They reach their highest damping forces at the respective obstacle maximum but at different retraction strokes, whereby the shock absorber 1 always releases as much retraction distance, as it is necessary for the complete absorption of the differently high obstacles. With the damping force course 70 over the curbstone edge, the maximum damping force is not reached, since the time duration that the analogue piston of the shock absorber requires to move from the first to the second extreme position is set such that it has not elapsed during reaching of the obstacle maximum, respectively of the stroke excitation maximum. The maximally reached damping force over the curbstone edge is therefore smaller than the maximally reached damping force over the low stone, whereby a particular comfort setting of the shock absorber over particular hard and fast impacts is reached.

The functions are analogue for the extension movements of the shock absorber according to the other example embodiments of the invention.

It is understood that the foregoing description is that of the preferred embodiments of the invention and that various changes and modifications may be made thereto without departing from the spirit and scope of the invention as defined in the appended claims.

LIST OF REFERENCE NUMERALS 1 shock absorber
2 shock absorber cylinder
3 damping volume
4 damping fluid
5 shock absorber piston
6 piston rod
7 retraction direction of the shock absorber
8 damping opening
9 compensation volume reservoir
10 compensation piston
11 entry opening
12 exit opening
13 ascending pipe
14 compression stage
15 stage throttle
16 disk valve
17 valve disk
18 valve shaft
19 closing direction of the disk valve
20 valve disk pressure surface
21 disk valve seat
22 entry edge of the disk valve seat
23 protrusion
24 analogue piston
25 analogue piston pressure surface
26 pressure channel
27 analogue piston counter surface
28 counter channel
29 first piston head
30 second piston head
31 first chamber
32 second chamber
33 connection recess
34 piston shaft
35 gas spring
36 gas
37 damping fluid seal
38 gas seal
39 access channel
40 pipe piece
41 tilt seal
42 pressure adjustment screw
43 biasing spring
44 damping fluid channel 45 cross-section reduction
46 back flow valve
47 back flow bypass
48 extra spring
49 stop
50 non-return valve
51 seat ring
52 non-return valve seat
53 rebound stage
54 support seat
55 valve disk piston surface
56 hollow cylinder
57 piston stump
58 time axis
59 end of time duration
60 excitation amplitude of the stroke excitation
61 stroke excitation of desired damping strut movement
62 stroke excitation of undesired damping strut movement
63 stroke excitation maximum
64 range of stroke maxima at obstacles
65 excitation duration of stroke excitation
66 stroke excitation by curbstone edge
67 stroke excitation by low stone
68 stroke excitation by breaking process
69 stroke excitation by pedaling
70 damping force curve at stroke excitation 66 by curbstone edge
71 damping force curve at stroke excitation 67 by low stone
72 damping force curve at stroke excitation 68 by breaking process
73 damping force curve at stroke excitation 69 by pedaling
74 retraction stroke
75 damping force

What is claimed is:

1. A movement stage for a hydraulic shock absorber comprising:
 a damping volume filled with an incompressible damping fluid;
 a stage throttle having a disk valve with a valve disk, an analogue piston and an elastic spring configured to bias the valve disk in a closing direction of the disk valve;
 said stage throttle being arranged so that the damping fluid flows through the stage throttle in a direction opposite to the closing direction of the disk valve as the shock absorber moves in one movement direction;
 said disk valve being configured to generate a shock absorber resistance force;
 said elastic spring being supported on the analogue piston and on the valve disk to elastically couple the analogue piston via the elastic spring with the disk valve;
 said valve disk having a valve disk pressure surface;
 said valve disk pressure surface being a portion of a surface of the disk valve that is arranged upstream of an entry edge of a disk valve seat;
 said analogue piston having an analogue piston pressure surface facing away from the valve disk pressure surface;
 said analogue piston pressure surface being arranged to face away from the elastic spring;
 said valve disk pressure surface and said analogue piston pressure surface being directly impinged by the damping fluid flowing out of the damping volume during the movement of the shock absorber in the one movement direction; and,
 said analogue piston pressure surface being larger than said valve disk pressure surface when projected in the closing direction of the disk valve so that a bias of the valve disk is increased when the analogue piston is displaced towards the elastic spring as the shock absorber moves in the at least one movement direction.

2. The movement stage according to claim 1, wherein said analogue piston pressure surface is up to four times larger than the valve disk pressure surface when projected in the closing direction of the disk valve.

3. The movement stage according to claim 1, wherein the analogue piston has an analogue piston counter surface that is facing away from said analogue piston pressure surface, and wherein said analogue piston counter surface is impinged by the damping fluid that has already passed the disk valve seat as the shock absorber moves in the one movement direction.

4. The movement stage according to claim 3, wherein said analogue piston pressure surface and said analogue piston counter surface are equally large when projected in the closing direction of the disk valve.

5. The movement stage according to claim 1, wherein the elastic spring is arranged between the analogue piston and the valve disk to spatially isolate the elastic spring from the damping fluid that has not yet passed the disk valve seat as the shock absorber moves in the one movement direction.

6. The movement stage according to claim 1, wherein the analogue piston is arranged on the disk valve in a displaceable manner, and wherein the analogue piston is sealed by a damping fluid seal.

7. The movement stage according to claim 1, wherein the disk valve has a valve shaft, wherein the valve shaft has a shape of a hollow cylinder, wherein the valve disk is arranged outside the valve shaft, wherein the analogue piston is arranged in the valve shaft in a displaceable manner, and wherein the valve shaft has on its inner side a protrusion on which the elastic spring is supported.

8. The movement stage according to claim 1, wherein the analogue piston is configured to move to a first extreme position at which the bias force that is transferred from the analogue piston via the elastic spring to the valve disk is zero.

9. The movement stage according to claim 8, wherein the analogue piston is moved to a second extreme position at which the bias force, that is transferred from the analogue piston via the elastic spring to the valve disk, has a maximum value.

10. The movement stage according to claim 9, wherein the analogue piston moves in the closing direction of the disk valve as it moves from the first extreme position to the second extreme position.

11. The movement stage according to claim 10, wherein the analogue piston is arranged at the second extreme position on a stop of the movement stage.

12. The movement stage according to claim 1, further comprising:
 a non-return valve having a closing direction opposite to the closing direction of the disk valve;
 a seat ring being concentrically arranged around a valve shaft; and,
 said disk valve seat being arranged on a front side of the seat ring and said non-return valve seat being arranged on another side of the seat ring so that the non-return valve is closed as the disk valve is open and the non-return valve is open as the disk valve is closed, whereby the non-return valve acts as a counter stage throttle to the stage throttle.

13. The movement stage according to claim 1, wherein the elastic spring is a coil spring.

14. The movement stage according to claim 1, wherein the elastic spring is a gas spring.

15. The movement stage according to claim 14, further comprising:
a chamber between the analogue piston and a protrusion of the valve shaft, wherein the chamber is filled with a gas,
wherein the protrusion has a shape of a ring, and
wherein the analogue piston has a piston shaft that extends through the opening of the protrusion and that is arranged on the protrusion in a gas sealed manner.

16. The movement stage according to claim 14, wherein the analogue piston includes a first piston head and a second piston head held in a distance relative to one another by the piston shaft, wherein a protrusion is arranged between the first and the second piston heads so that a first chamber and a second chamber are defined by the first and second piston heads and the protrusion, and wherein the first and second chambers are filled with a gas.

17. The movement stage according to claim 16, wherein the piston shaft includes a connection recess, and wherein a gas pressure equalizes in the first and second chambers via the connection recess when the analogue piston is at a position at which the protrusion is positioned next to the connection recess so that the first and second chambers are connected with one another in a gas conductive manner.

18. The movement stage according to claim 17, wherein the position is a first extreme position.

19. The movement stage according to claim 1, wherein:
said stage throttle includes a damping fluid channel, the damping fluid channel having a first portion and a second portion,
said first portion of the damping fluid channel is arranged between the damping volume and the second portion of the damping fluid channel,
said second portion of the damping fluid channel is arranged between the first portion of the damping fluid channel and the analogue piston pressure surface, and
said second portion of the damping fluid channel has a reduced cross-section with respect to said first portion and is configured to adjust displacement velocities of the analogue piston in relation to the movement velocities of the shock absorber.

20. The movement stage according to claim 19, further comprising a back flow bypass having a back flow valve;
wherein said back flow bypass is arranged in parallel to the cross-section reduction,
wherein said back flow valve is in a closed position as the bias force of the valve disk is increased by the analogue piston via the elastic spring; and
wherein said back flow valve is in an open position as the bias force of the valve disk is decreased by the analogue piston via the elastic spring.

21. The movement stage according to claim 1, wherein the stage throttle includes an additional elastic spring configured to always bias the valve disk in the closing direction of the disk valve.

22. The movement stage according to claim 16, wherein the disk valve includes an access channel arranged to access at least one of the first and second chambers from an outside.

23. The movement stage according to claim 22, wherein the access channel has a pipe piece arranged perpendicular to the closing direction of the disk valve, wherein a first longitudinal end of said pipe piece is pivotably arranged in the disk valve, and wherein a second longitudinal end of said pipe piece is pivotably arranged in a casing of the shock absorber.

24. The movement stage according to claim 9, wherein the valve disk is brought in a full open position by a remaining stroke of the elastic spring as the analogue piston is at the second extreme position.

25. The movement stage according to claim 9, wherein a stroke of the analogue piston that is generated as the analogue piston moves from the first extreme position to the second extreme position is larger than a complete valve stroke of the valve disk.

26. The movement stage according to claim 25, wherein the stroke of the analogue piston that is generated as the analogue piston moves from the first extreme position to the second extreme position is at least four times larger than the complete valve stroke of the valve disk.

27. The stage according to claim 1, wherein the elastic spring has in at least one range of a valve stroke (x) of the valve disk a force-distance characteristic curve, and wherein a first derivative of the force-distance characteristic curve is substantially zero ($F'=dF/dx \approx 0$).

28. The movement stage according to claim 27, wherein the at least one range of the valve stroke (x) corresponds to a complete valve stroke of the valve disk.

29. A shock absorber comprising the movement stage according to claim 1.

30. The shock absorber according to claim 29, wherein the shock absorber includes two movement stages, and wherein one of the two movement stages is a compression stage and the other of the two movement stages is a rebound stage.

* * * * *